United States Patent [19]

Kaneko et al.

[11] Patent Number: 4,931,965
[45] Date of Patent: Jun. 5, 1990

[54] COORDINATES INPUT APPARATUS

[75] Inventors: Kiyoshi Kaneko, Yokohama; Atsushi Tanaka, Kawasaki; Yuichiro Yoshimura, Tokyo; Katsuyuki Kobayashi, Tokyo; Shinnosuke Taniishi, Tokyo, all of Japan

[73] Assignee: Canon Kabushiki Kaisha, Tokyo, Japan

[21] Appl. No.: 67,546

[22] Filed: Jun. 29, 1987

[30] Foreign Application Priority Data

| Jun. 27, 1986 | [JP] | Japan | 61-149742 |
| Jun. 27, 1986 | [JP] | Japan | 61-149743 |
| Jul. 4, 1986 | [JP] | Japan | 61-156231 |
| Jul. 4, 1986 | [JP] | Japan | 61-156232 |
| Jul. 4, 1986 | [JP] | Japan | 61-156233 |
| Jul. 4, 1986 | [JP] | Japan | 61-156234 |
| Jul. 4, 1986 | [JP] | Japan | 61-156235 |
| Jul. 4, 1986 | [JP] | Japan | 61-156236 |
| Jul. 4, 1986 | [JP] | Japan | 61-156237 |
| Oct. 17, 1986 | [JP] | Japan | 61-245470 |
| Oct. 17, 1986 | [JP] | Japan | 61-245472 |
| Oct. 17, 1986 | [JP] | Japan | 61-245474 |
| Oct. 17, 1986 | [JP] | Japan | 61-245475 |
| Oct. 22, 1986 | [JP] | Japan | 61-249738 |

[51] Int. Cl.$^5$ .................................................. G01B 17/00
[52] U.S. Cl. .................................... 364/560; 178/18; 367/907
[58] Field of Search ............... 33/1 P, 1 CC, 125 W; 178/18, 19; 340/686; 364/556, 560; 367/907

[56] References Cited

U.S. PATENT DOCUMENTS

| 3,857,022 | 12/1974 | Rebane et al. ............ 178/18 X |
| 4,488,000 | 12/1984 | Glenn .......................... 178/18 |
| 4,564,928 | 1/1986 | Glenn et al. ............ 367/907 X |
| 4,665,282 | 5/1987 | Sato et al. .................. 178/18 |
| 4,745,565 | 5/1988 | Garwin et al. ............ 178/18 X |

FOREIGN PATENT DOCUMENTS

| 0169538 | 1/1986 | European Pat. Off. . |
| 3027923 | 2/1982 | Fed. Rep. of Germany . |
| 2042726 | 9/1980 | United Kingdom . |

OTHER PUBLICATIONS

Japanese Patent Abstracts, vol. 7, No. 113 (P-197)[1258], May 18, 1983.

Primary Examiner—Parshotam S. Lall
Assistant Examiner—Edward R. Cosimano
Attorney, Agent, or Firm—Fitzpatrick, Cella, Harper & Scinto

[57] ABSTRACT

A coordinates input apparatus, for example, a digitizer, has a vibration propagation medium such as a transparent glass plate for allowing a vibration to propagate therethrough; an input pen for applying vibration to the vibration propagation medium; a vibration detector for detecting vibration applied by the input pen; an envelope output device for producing an envelope signal representing the envelope of the vibration detected by the vibration detector; a differentiator for conducting a differentiation of the envelope signal produced by the envelope output device so as to determine the peak; a controller adapted for determining, as the time of arrival of the vibration, a zero-cross point of the vibration that is located in the vicinity of a zero-cross point of the signal from the differentiator; and a computing device for computing the distance between the input pen and the vibration detector from the time determined by the controller.

81 Claims, 26 Drawing Sheets

COORDINATES INPUT APPARATUS

BACKGROUND OF THE INVENTION

1. Field of the Invention

The present invention relates to a coordinates input apparatus which makes use of an elastic wave, particularly a plate elastic wave.

2. Related Background Art

A known coordinates input apparatus makes use of a CRT in combination with a light pen. The light pen is placed at a position on the CRT so that the position is sensed from the raster timing peculiar to the position. This known apparatus essentially requires a CRT and, hence, can be used only in high-class systems.

Another known coordinates input apparatus employs a tabular member on which is provided a specific electrode pattern. An electric current is made to flow through this electrode pattern and a voltage drop amount at an appointed position on the electrode pattern is measured, whereby the coordinates of the appointed position are determined. In this apparatus, however, the coordinates input apparatus cannot be made transparent because of the presence of the electrode pattern.

Both these known coordinates input apparatus are generally expensive and are not suitable for use in comparatively inexpensive products such as desk-top calculators and word processors.

Under these circumstances, a method has been proposed for detecting the coordinates by making use of vibration. More specifically, this method employs an input pen the end of which is vibrated and brought into cantact with a plate such a glass. The vibration applied to the plate is sensed by a sensor and the position of the pen is detected through measuring the vibration propagation time. In this case, the vibration is utilized in the form of surface wave which is liable to be disturbed by any flaw in the glass or by a touch by the user's finger, with the result that the accuracy of detection of coordinates is impaired.

SUMMARY OF THE INVENTION

Accordingly, an object of the present invention is to provide coordinates input apparatus which is inexpensive as compared with known coordinates input apparatus.

Another object of the present invention is to provide a coordinates input apparatus which makes use of an elastic wave, particularly plate elastic wave, thereby preventing the detection accuracy from being impaired by any flaw existing in the vibration propagation medium or by a touch by a foreign matter.

Still another object of the present invention is to provide a transparent coordinates input apparatus.

A further object of the present invention is to provide a coordinates input apparatus capable of operating with a high degree of accuracy.

A still further object of the present invention is to provide a coordinates input apparatus which is improved in such a way as to eliminate any error attributable to inclination of the input pen.

A still further object of the present invention is to provide a coordinates input apparatus which is improved such as to reduce any influence of the wave which is produced as a result of reflection of vibration by the propagation medium to which the vibration is applied.

A still further object of the present invention is to provide a coordinates input apparatus which is improved in such a way as to prevent any erroneous operation which may be caused by a contact between an input pen and a sensor.

A still further object of the present invention is to provide a coordinates input apparatus which is improved in such a manner as to compensate for any delay in the determination of coordinates from the propagation time, thereby assuring high accuracy of position detection.

A still further object of the present invention is to provide a coordinates input apparatus capable of obtaining accurate coordinates by measuring group velocity and phase velocity of a plate elastic wave.

A still further object of the present invention is to provide a coordinates input apparatus in which generated vibration is transmitted to the propagation medium at a high efficiency and the vibration transmitted to the propagation medium can be detected at a high efficiency.

A still further object of the present invention is to provide a coordinates input apparatus in which coordinates are detected with a high degree of accuracy by making use of only necessary sensors amongst a plurality of sensors.

A still further object of the present invention is to provide a coordinates input apparatus capable of detecting whether the input pen is in contact with the propagation medium.

BRIEF DESCRIPTION OF THE DRAWINGS

FIG. 18 is a timing chart showing driving pulses, detection signal, envelop curve of the detection signal, and so on;

FIG. 25 is a timing chart similar to FIG. 18, illustrating driving pulses, detection signal, envelop curve of the detection signal, and so on;

FIG. 35 is a timing chart illustrating the driving pulse, detection signal, and so on;

DESCRIPTION OF THE PREFERRED EMBODIMENTS

An embodiment of the present invention will be described hereinunder with reference to the drawings.

Figure 1:
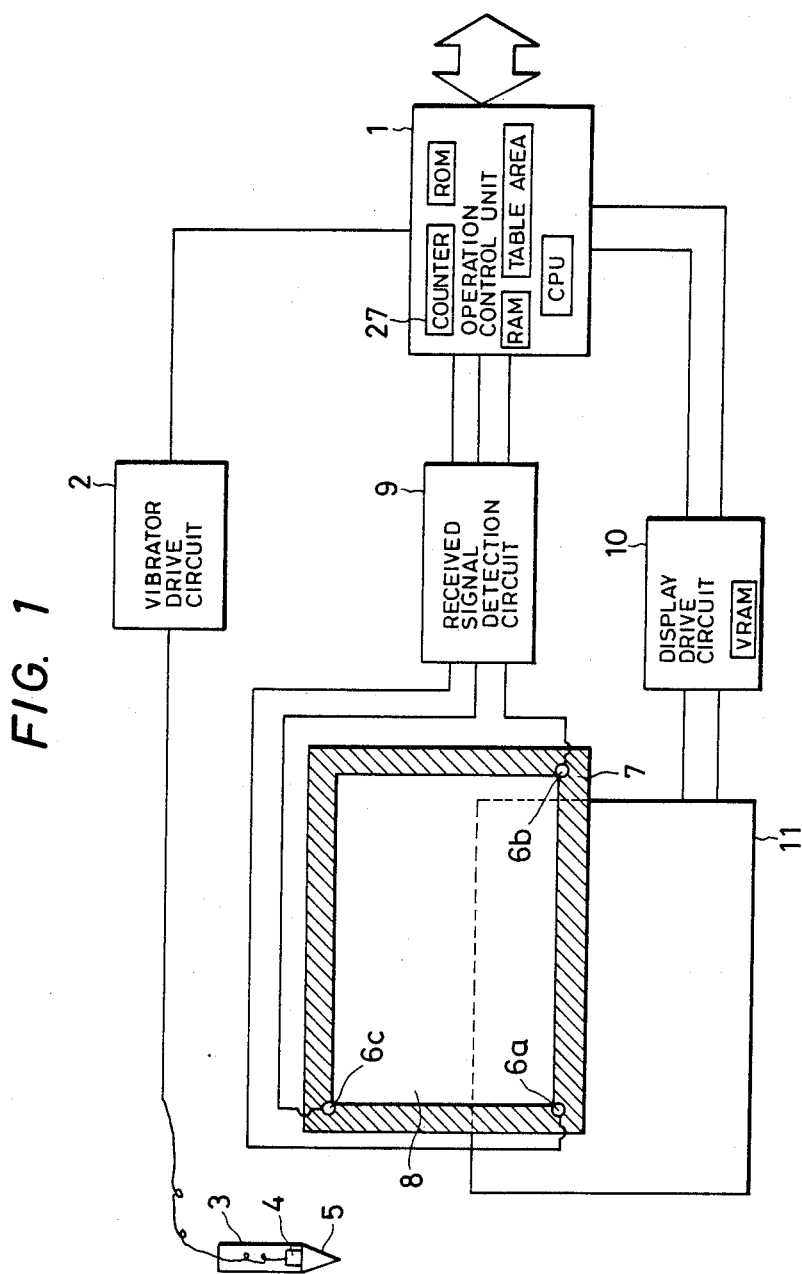
FIG. 1 is a diagrammatic illustration of the whole of a coordinates input apparatus in accordance with the present invention.

FIG. 1 shows the whole of a coordinates input apparatus embodying the present invention. The apparatus has an operation control unit 1 adapted for controlling the operation of the whole apparatus and for computing coordinate positions. The operation control unit 1 is capable of transmitting the computed coordinate positions to an external host computer or other devices as required. The apparatus also has a vibrator drive circuit for transmitting a pulse signal to a piezoelectric element 4 which will be mentioned later. The apparatus further employs an input pen 3 for inputting coordinates. The input pen 3 incorporates a vibrator 4 constituted by the piezoelectric element excited by the pulse signal from the vibrator drive circuit 2, and a pen point 5 (referred to as horn hereinafter) adapted for expanding the vibration transmitted from the vibrator 4. Sensors 6a to 6c are constituted by piezoelectric elements adapted for receiving elastic waves propagated through a propagation medium such as a glass when a position in the medium is appointed by the input pen 3 and for converting the received wave into electric signals. An anti-reflection member 7, which is made of a suitable material such as silicone rubber, is adapted for eliminating any reflection of wave at the edges of the propagation medium 8. The apparatus further has a received wave detection unit 9 for generating a signal representing the time of delay of the elastic wave transmitted from the input pen 3 to the propagation medium 8 on the basis of the electric signals generated by the piezoelectric elements 6a to 6c in response to the elastic wave. The construction of the received signal detection circuit will be descirbed later. The apparatus further has a display drive unit 10 adapted for enabling a display 11 to display, for example, a dot at a position corresponding to data representing the coordinate values of the position contacted by the horn 5 of the input pen 3 in the operation control unit 1. The display drive unit has a VRAM adapted for developing the pattern to be displayed on the display 11. The display 11 is adapted to be superposed on the propagation medium 8 so that it can display the position data input by the input pen 3 in real time as if the position is written by a pencil on a sheet.

The operation of this apparatus is as follows.

An elastic wave is generated in the propagation medium 8 when a position on the latter is appointed by the input pen 3. The elastic wave is received by the sensors 6a to 6c which convert the received wave into electric signals (referred to as detection signals hereinafter) of levels corresponding to the level of the received wave. Upon receipt of these detection signals, the received signal detection circuit 9 generates a receive signal which is delivered to the operation control unit 1. Upon receipt of the receive signal, the operation control unit 1 computes the coordinates of position of the point P at which the propagation medium 8 is contacted by the input pen 3, and delivers the position coordinates data to the display drive circuit 10 so as to enable the display 11 to display the position corresponding to the point where the input pen 3 contacts the propagation medium 8.

Figure 2:
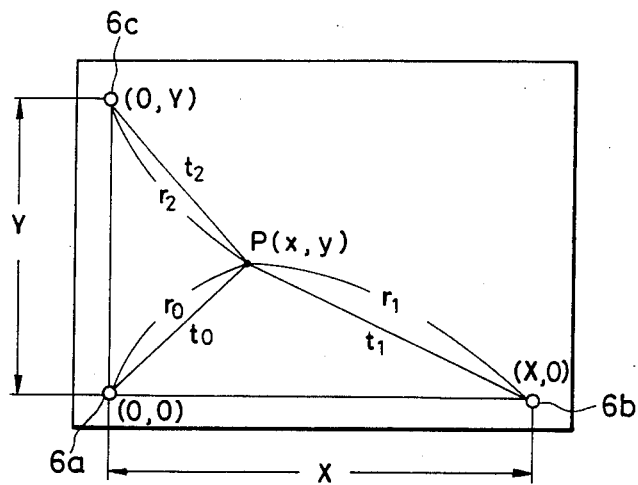
FIG. 2 is an illustration of a method for determining the position of an input pen from the relationship between the vibration propagation time or propagation distance and the position of a sensor.

More specifically, the operation control unit 1 delivers a start signal to the vibrator drive circuit 2. The operation control unit 1 also starts a counter 27 for counting time, in synchronism with the start of the vibrator drive circuit 2. Upon receipt of the start signal, the vibrator drive circuit 2 starts to drive the vibrator 4 in the input pen 3 so as to generate an elastic wave in the elastic wave propagation medium 8. The elastic wave propagates through the medium 8 and reaches the sensors 6a to 6c so that the sensors 6a to 6c deliver electric signals to the received wave detection circuit 9. The circuit 9 then detects the elastic wave and transmits the receive signals to the operation control unit 1. The operation control unit 1 then reads the content of the counter 27 upon arrival of the receive signals, so that the propagation delay times are detected. Using the propagation delay times detected as above the distances are determined by a process which will be explained hereinunder with reference to FIG. 2.

It is assumed that the sensors 6a, 6b and 6c are located at coordinate positions (0,0), (X,0) and (0,Y), respectively, and that the coordinates of the point P at which the elastic wave is generated, i.e., the position appointed by the input pen, are (x,y). Representing the propagation velocity of the elastic wave in the propagation medium 8 by $V_k$, and the delay times till the arrival of the elastic waves at the respective sensors 6a, 6b and 6c by $t_0$, $t_1$ and $t_2$, while representing the propagation distances by $r_0$, $r_1$ and $r_2$, respectively, the coordinates (x,y) of the point P are determined by the following formulae (1) or (2).

$$x = X/2 + V_k^2(t_0 + t_1)(t_0 - t_1)/2X \quad (1)$$
$$y = Y/2 + V_k^2(t_0 + t_2)(t_0 - t_2)/2Y$$

or $$x = X/2 + (r_0^2 - r_1^2)/2X \quad (2)$$
$$y = Y/2 + (r_0^2 - r_2^2)/2Y$$

Constructions of Elastic Wave Propagation Medium and Sensors

Figure 3:
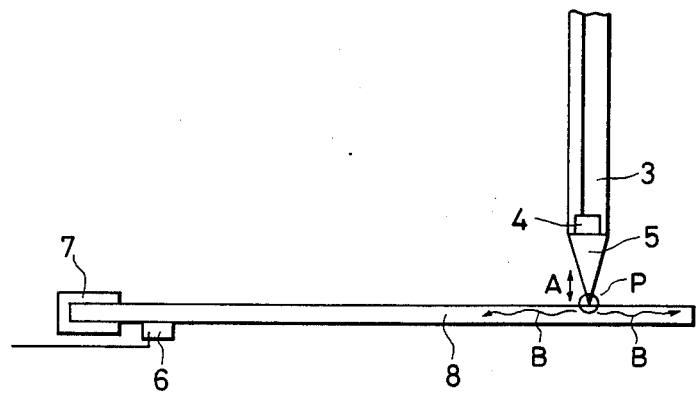
FIG. 3 is a side elevational view of the apparatus around the vibration propagation medium.

FIG. 3 is a schematic side elevational view of the portion of the coordinates input apparatus around the propagation medium 8. Arrows A and B represent, respectively, the direction of vibration of the end of the horn 5 and the direction of propagation of the elastic wave through the propagation medium 8. The vibration of the horn 5 is transmitted to the elastic wave propagation medium 8 at the contact point P as explained before. The vibration is then propagated through the medium 8 as a plate wave elastic wave in a spherical form in the directions of arrows B and is sensed by sensors (only one of them is shown and denoted by 6) attached to the side of the propagation medium 8 opposite to the contact point P. The operation is then commenced in the manner explained before.

The positions of the sensors shown in FIG. 1 are only illustrative. When three or more sensors are used, they may be attached to any desired positions on the reverse side of the elastic wave propagation medium 8, provided they are not arranged on a common line. When only two sensors are used, they are disposed at positions along the periphery of the propagation medium 8.

Figure 4A:
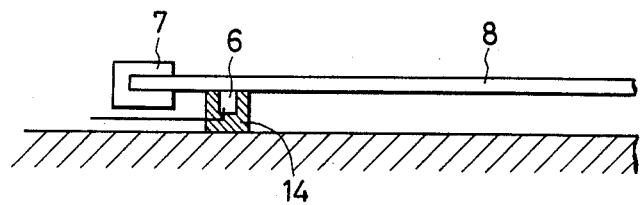
FIGS. 4A, 4B and 4C are illustrations of different layouts of constituents such as a anti-reflection member 7, sensor 6 and a supporting member 14 in relation to the position of the propagation medium.
Figure 4B:
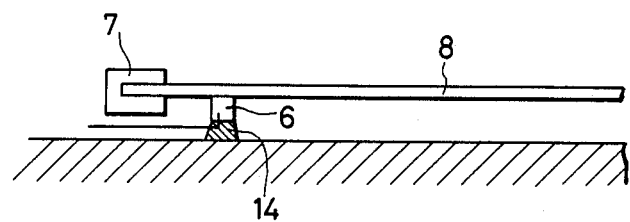
Figure 4C:
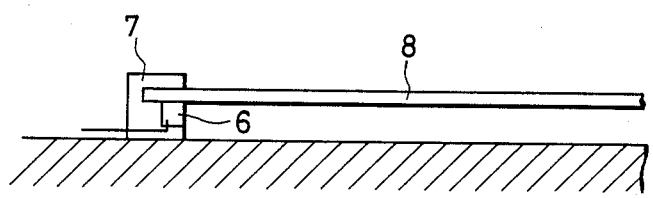

In this embodiment, the sensors 6a to 6c constituted by vibration detecting piezoelectric elements are secured to the reverse side of the elastic wave propagation medium, i.e., to the side of the medium 8 opposite to the side contacted by the input pen 3. These sensors, therefore, may function also as supporting means in placing the elastic wave propagation medium 8. FIGS. 4A to 4C show examples of the arrangement in which the sensors 6a to 6c have supporting function. In the arrangement shown in FIG. 4A, the sensor 6 is surrounded by or embedded in a supporting member 14. In FIG. 4B, the sensor is supported by the supporting member which is secured to the underside thereof. In the arrangement shown in FIG. 4C, the sensor is embedded in and supported by anti-reflection member 7. The supporting member 14 is preferably made from a material such as a rubber, a polymeric material or an inorganic material.

Although in the illustrated embodiment the vibration is imparted by the horn 5 in the vertical direction A as illustrated in FIG. 3, the vibration may be imparted by vibrating the horn in lateral direction, since the vibration once transmitted to the propagation medium propagates in the same manner as described as a plate wave elastic wave, producing the same effect as that described above.

In the described embodiment, the sensors are attached to the side of the propagation medium opposite to the side contacted by the input pen 3, so that even the positions right above the sensors can be appointed by the input pen 3. That is, the effective input area can be increased. In addition, the input operation is facilitated because there is no risk for the input pen to be interfered by the sensors, and the detection of the position coordinates is stabilized advantageously. When three or more sensors are used, these sensors nay be attached to any desired portions on the reverse side of the propagation medium 8, provided that they are not arrayed on a line, so that the degree of freedom is increased in the selection of position of the sensors as compared with the known apparatus in which the sensors have to be provided on the periphery of the propagation medium. Furthermore, the sensors can be used also as supports for supporting the propagation medium.

It is preferred that the frequency of the electric pulse signal (driving frequency) generated by the vibrator drive circuit 2 preferably approximates the resonance frequencies of the input pen and the sensors 6, as much as possible. More preferably, these three frequencies are set to be equal so that detection signals without strain are obtained from the sensors 6, thus assuring a high accuracy of the position detection.

Figure 5:
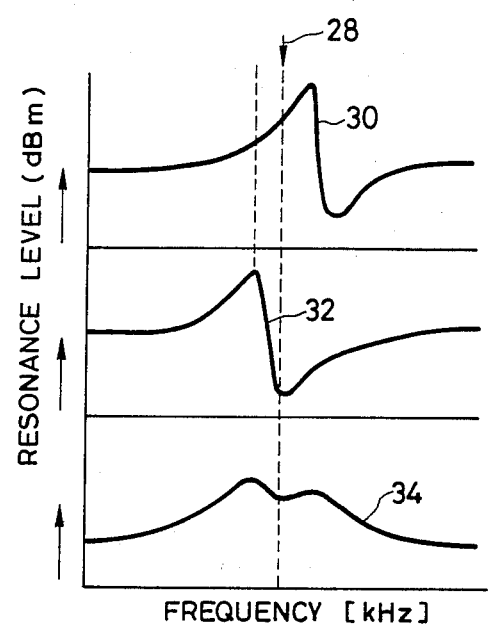
FIG. 5 is an illustration of the frequency characteristics as obtained when the driving frequency does not coincide with the resonance frequency.
Figure 6:
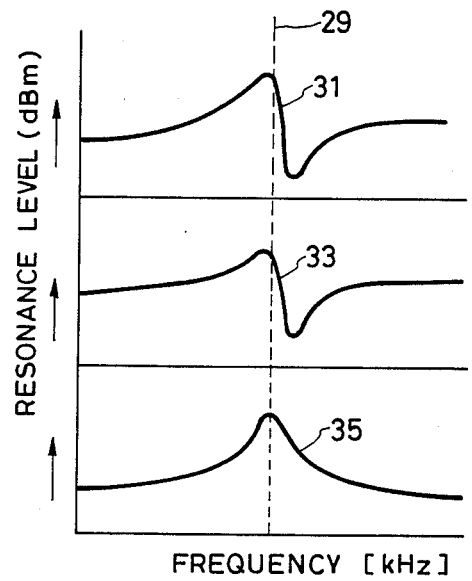
FIG. 6 is a diagram showing the frequency characteristics as obtained when the driving frequency coincides with the resonance frequency.

FIG. 5 shows the frequency characteristics of the apparatus as obtained when the driving frequency, the resonance frequency of the input pen 3 and the resonance frequency of the sensors 6 do not accord with one another, while FIG. 6 shows the frequency characteristics as obtained when these three frequencies are equal to one another. In FIGS. 5 and 6, lines 28 and 29 show the driving frequency. Curves 30 and 31 represent the frequency characteristics of the input pen 3, while curves 32 and 33 represent the frequency characteristics of the sensors 6. Frequency spectral curves showing the frequency spectrum of the detection signals are denoted by numerals 34 and 35.

Figure 7:
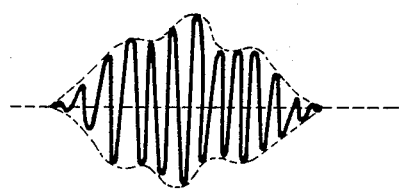
FIG. 7 is an illustration of a detaction signal obtained when the driving frequency does not coincide with the resonance frequency.

Referring first to FIG. 5, the peaks of the frequency characteristics curve 30 of the input pen 3 and the frequency characteristic curve 32 of the sensors 6, i.e., the resonance frequencies of the input pen 3 and the sensors 6 are offset from each other and offset also from the driving frequency 28. In this case, a plurality of peaks appear in the frequency spectrum of the signal (detection signal) derived from the sensor 6. Thus, the detection signal inevitably has a plurality of frequency components of similar levels and exhibits a distorted waveform as shown in FIG. 7. It is extremely difficult to pickup the designated frequency component from this waveform with a high accuracy.

Figure 8:
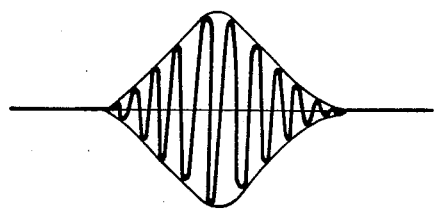
FIG. 8 is an illustration of a detection signal obtained when the driving frequency coincides with the resonance frequency.

In the embodiment of the present invention, the driving frequency and the frequencies of the peaks of the frequency characteristics curves 31 and 33 of the input pen 3 and the sensor 6, i.e., the resonance frequencies of the input pen 3 and the sensor 6, coincide with one another, as shown in FIG. 6. In this case, the detection signal exhibits a frequency spectrum which includes only one peak at the driving frequency, i.e., at the resonance frequencies of the input pen 3 and the sensor 6. Thus, the detection signal having only one frequency component exhibits a waveform having no distortion, as shown in FIG. 8, so that the position coordinates can be detected with high accuracy from this waveform. In this case, the amplitude of the waveform of the detection signal is large so that the detection efficiency and the S/N ratio are increased advantageously.

The resonance frequency of the input pen 3 delicately varies according to the state of bonding between the piezoelectric element 4 and the horn 5. It is, therefore, advisable that the resonance frequencies of the vibrator 4 and the horn 5 are selected to approximate each other as much as possible or made equal to each other if possible, and the bonding conditions such as the thickness of the bond are beforehand adjusted such that the input pen as a unit exhibit, a resonance frequency which coincides with the driving frequency and the resonance frequency of the sensor.

Preferably, an asymmetrical mode mainly consisting of transversal wave component is used as the plate wave elastic wave, while the piezoelectric elements of the input pen 3 and the sensor 6 are designed for longitudinal or thicknesswise vibrations, with the resonance frequencies thereof being set equal to each other. This is because the plate wave asymmetrical mode mainly composed of transversal wave component exhibit amplitude levels greater that the plate wave symmetrical mode mainly composed of longitudinal wave component, when propagated through the propagation medium 8, so that the use of such asymmetrical mode facilitates the detection.

Although the described embodiment makes use of sensors 6 made of vibration detecting sensors, this is not exclusive and the sensor may be constituted by a combination of a piezoelectric sensor and the horn. Such a combination can detect vibration in spot region at a higher level of accuracy than the vibration detecting piezoelectric element alone. In such a case, as is the case of the input pen, the conditions of bonding between the piezoelectric element and the horn are carefully determined such that the resonance frequency of the sensor 6 coincides with the driving frequency and the resonance frequency of the input pen. When piezoelectric elements designed for vibration in longitudinal or thicknesswise vibration mode is used in the input pen 3 and the sensor 6, the horns used in the input pen 3 and the sensor 6 also are set to exhibit the same resonance frequencies as these piezoelectric elements in the longitudinal vibration mode.

Figure 9:
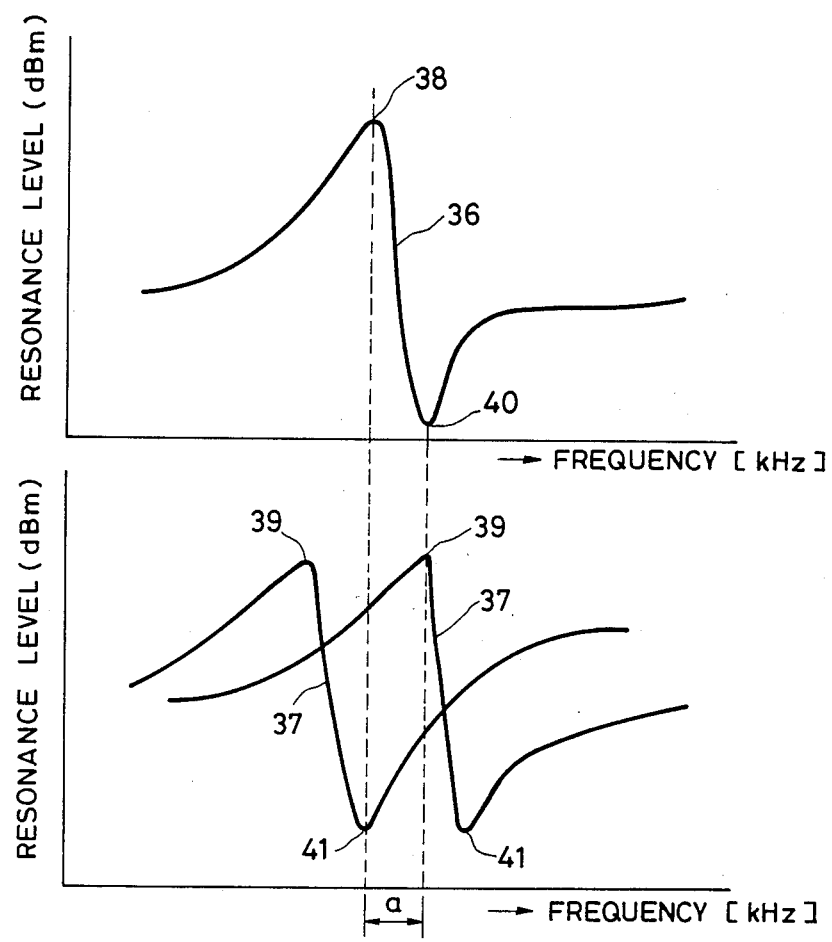
FIG. 9 is an illustration of deviation between the resonace frequency of the input pen and the resonance frequency of the sensor.

As mentioned in the foregoing description of the embodiment, it is possible to obtain a detection signal having a single peak, provided that the driving frequency and the resonance frequencies of the input pen 3 and the sensor 6 are close to each other. This advantageous effect can be obtained when the offset of these frequencies is within a certain tolerance which can be expressed as ± a which is the difference between each resonance frequency and anti-resonance frequency. FIG. 9 shows this limit or tolerance of offset of the frequency. In FIG. 9, a curve 36 shows the frequency characteristics of, for example, the input pen 3, while a curve 37 shows, for example, the frequency characteristics of the sensor 7. The resonance frequencies of the input pen 3 and the sensor 6 are represented by, for example, 38 and 39. Anti-resonance frequencies of the input pen 3 and the sensor 6 are denoted by 40 and 41. It is desirable that the amplitude of the detection signal to be obtained is as large as possible, and that the detection signal exhibits a waveform as shown in FIG. 6. Thus, from the view point of the detection efficiency, the offset of the resonance frequency between the input pen 3 and the sensor 6 preferably falls within the range of the difference ± a between the resonance frequency and the anti-resonance frequency which have opposite characters. This rule concerning the tolerance of the offset of resonance frequency can be applied also to the driving frequency.

Thus, in the coordinates input apparatus of the present invention which makes use of an elastic wave, the frequency of the pulse signal for driving the vibrator of the input pen 3, the resonance frequency of the input pen 3 and the resonance frequency of the sensors 6 are determined to be equal to each other. It is, therefore, possible to obtain a signal waveform with no distortion from the sensors at a high efficiency, thus ensuring a high degree of accuracy of detection of position coordinates.

Construction of Input Pen

An example of the horn 5 used in the input pen 3 incorporated in the coordinates input apparatus of the invention will be described hereinunder, with specific reference to FIG .10. The horn is denoted by a numeral 5b. The horn 5b has a conical form and is made of, for example, aluminum. The horn 5b has a large-diameter end A having a diameter $D_1$ and a small-diameter end B having a diameter $D_2$. The length of the horn 5b is represented by l. When the resonance frequency f of the horn is 400 KHz, the diameters $D_1$ and $D_2$ and the length l are derived as follows, respectively, form the following formula (3) which expresses the resonance condition.

$$D_1 = 5.0 \text{ mm}, D_2 = 0.5 \text{ mm}, l = 8.15 \text{ mm}$$

$$\tan \alpha l = \frac{\alpha l}{1 + \frac{D_1/D_2}{(D_1/D_2 - 1)^2} \cdot (\alpha l)^2} \quad (3)$$

where, $\alpha$ represents the wavelength constant (W/c), c represents the sonic velocity in the horn material (5040 (m/sec) in case of aluminum) and W represents the resonance angular frequency ($2\pi f$) of the horn.

The diameter $D_1$ of the large-diameter end A is not selected so large because undesirable effects such as resonance in the radial direction occur when the diameter $D_1$ approaches or exceeds the half wavelength. Considering that the vibrator 4 vibrates at a frequency of 300 to 500 KHz, the diameter $D_1$ is preferably selected to be 5 mm or so. The magnifying ratio provided by the horn 5b is determined by the diameter ratio $D_1/D_2$. In the illustrated embodiment, this ratio is about 4.3.

Anyway, the input pen 3 incorporating this horn 5b can resonate at the vibration frequency of the vibrator 4.

Figure 11A:
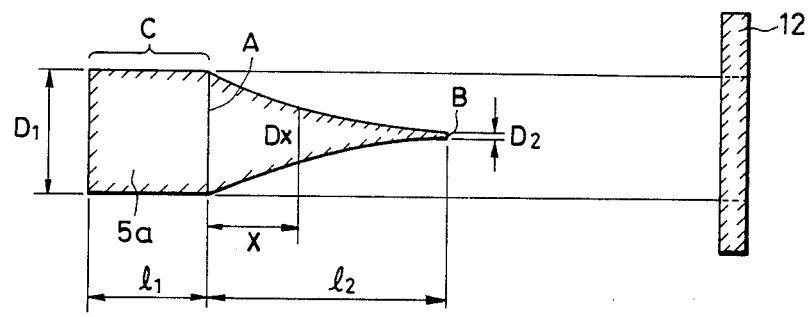
FIGS. 11A and 11B are illustrations of conically-shaped horns.
Figure 11B:
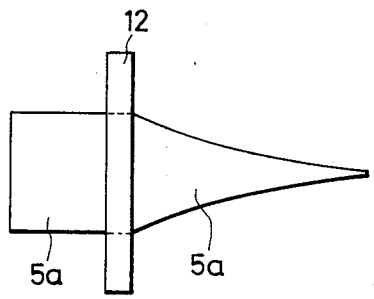

Although the horn 5b has been described to have a conical shape, this shape is not exclusive and the horn 5b can have other forms such as to exhibit, for example, a longitudinal cross-section represented by exponential function, as is the case of a horn 5a shown in FIGS. 11A and 11B. In FIG. 11A, the large-diameter end and the small-diameter end of the horn 5a are indicated at A and B, respectively, while C represents straight portion connected to the large-diameter end A. The diameters of the large-diameter end A and the small-diameter end B are represented by $D_1$ and $D_2$, respectively, while length of the straight portion C and the exponential portion of the horn 5a are represented by $l_1$ and $l_2$, respectively. A symbol X represents the distance of a predetermined point from the large-diameter end A, while $D_x$ represents the diameter of the horn 5a at the position X. A reference numeral 12 denotes a supporting flange by means of which the horn 5a is supported on the input pen 3.

Figure 10:
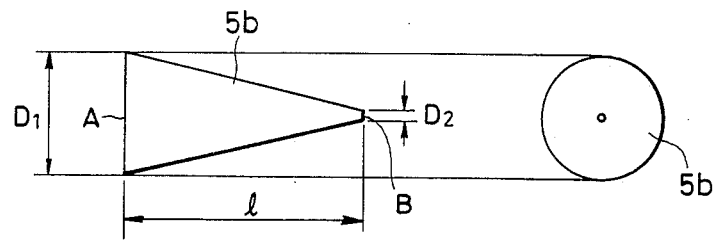
FIG. 10 is an illustration of the construction of the end of the input pen.

The horn incorporated in the described embodiment is small in size. If the horn is devoid of the straight portion C as in the case of the horn 5b shown in FIG. 10, it will be necessary to attach the supporting flange 12 to the tapered surfaces of the horn. Such a construction is extremely difficult to obtain and will increase the production cost. Therefore, such a horn with no straight portion is not suitable for use in the described embodiment of the invention.

In this embodiment, the supporting flange 12 of the horn 5a is attached to the portion of the straight portion C where the node of vibration appears, as shown in FIG. 11B. The positioning of the supporting flange at the node of vibration will minimize the loss of the vibration energy and, hence, maximizes the efficiency. The horn 5a and the straight portion C are formed integrally and the flange 12 is provided at the position where the node of amplitude of vibration appears. Such an arrangement will simplify the machining and reduce the cost appreciably.

When the horn 5a shown in FIG. 11A is used, the following conditions are obtained provided that the resonance frequency f is 400 KHz.

$D_1=5.0$ mm, $D_2=0.5$ mm, $l_1=4.0$ mm, $l_2=6.15$ mm, and $\beta=0.374$, where $\beta$ is an exponent represented by $D_x=D_1 e^{-\beta x}$ (mm)

These values are derived from the following formula (4) representing the resonance condition, formula (5) for determining the position $X_N$ of the vibration node plane and formula (6) for determining the amplitude magnification factor. Symbols appearing in these formulae represent the following factors:

$S_1$: Area of large-diameter end of horn
$S_2$: Area of small-diameter end of horn
$D_1$: Diameter of large-diameter end of horn
$D_2$: Diameter of small-diameter end of horn
$l_1$: Length of straight portion of horn
$l_2$: Length of exponential portion of horn
$\alpha$: Wavelength constant $=w/c$
$c$: Sonic velocity in horn material ($5.04 \times 10^3$ (m/sec) in case of longitudinal wave in alumina rod)
$f$: Resonance frequency of horn
$X$: Distance from large-diameter end of horn
$X_N$: Position of vibration nodal plane $$\frac{-\alpha l_2}{\log_e \sqrt{\frac{S_1}{S_2}} + \alpha l_2 \sqrt{1 - \frac{\beta^2}{\alpha^2}} \cdot \cot\left(\alpha l_2 \sqrt{1 - \frac{\beta^2}{\alpha^2}}\right)} \quad (4)$$

In formula (4) above, the factors $\beta$ and $\alpha$ are given as follows:

$$\beta = \frac{1}{l_2} \cdot \log_e \sqrt{\frac{S_1}{S_2}} = \frac{1}{l_2} \cdot \log_e\left(\frac{D_1}{D_2}\right) \quad (5)$$

$\alpha = w/c$ $\tan(\alpha\, x_N) 1/\tan(\alpha l_1)$ (Depends on straight portion when condition of $\alpha l_1 > \pi/2$.)

$$M = \left| \sqrt{\frac{S_1}{S_2}} \cdot \frac{\sqrt{1 - \frac{\beta^2}{\alpha^2}} \cdot \sin(\alpha l_1)}{\sin\left(\sqrt{1 - \frac{\beta^2}{\alpha^2}} \cdot \alpha l_2\right)} \right| \quad (6)$$

Figure 12:
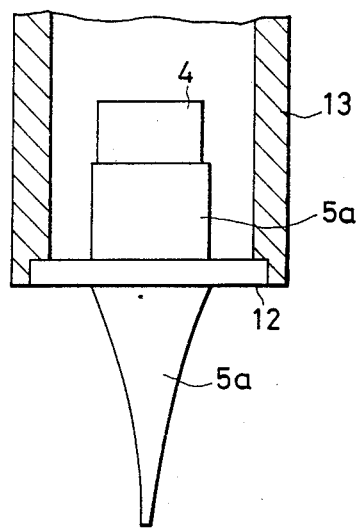
FIG. 12 is an illustration of the horn fixed to the holder of the input pen.

FIG. 12 shows an arrangement in which the horn 5a supported by the flange 12 shown in FIGS. 11A and 11B is fixed to a holder (housing) 13 of the input pen 3.

When the apparatus is used, the operator holds the input pen 3 by hand and appoints a desired position on the coordinates input tablet (vibration propagation medium 8) by means of the pen 3. Meanwhile, the vibrator 4 vibrates in accordance with the signal from the vibrator drive circuit 2 and the vibration is magnified by the horn 5a and delivered to the vibration propagation medium 8. The vibration is received and sensed by the sensors 6a to 6c which serve as the receiving elements and time lengths of delay of receipt of the vibration at the respective sensors are measured. The coordinates of the appointed position are then computed by making use of the thus measured delay times.

Thus, in the described embodiment, the horn 5 of the input pen 3 can have a resonance frequency which is equal to the driving frequency and the resonance frequency of the vibrator, so that the input pen 3 can deliver the elastic wave to the vibration propagation medium 8 exactly at the designated frequency. In consequence, any distortion in the waveforms of electric signals produced by the vibration receiving sensors 6 can be reduced, whereby a high accuracy and resolution of the coordinates input apparatus are ensured.

In addition, the horn 5 has a straight portion formed integrally with the conical or exponential portion and the flange 12 is attached to a portion corresponding to the vibration nodal plane. The thus formed horn is fixed to the holder 13 of the input pen 3 at the flange 12. This arrangement ensures a high efficiency of transmission of the vibration generated by the vibrator 4. In addition, since the contact pressure of the pen is not directly applied to the vibrator, the amplitude of the vibration is not affected by the contact pressure. This also serves to reduce any disturbance in the electric signals produced by the sensors 6a to 6c. Thus, the input pen having the descirbed embodiment contributes to improvement both in the resolution and accuracy.

The producibility of the input pen is also improved because the flange 12 is attached to a straight portion formed integrally with the conical or exponential portion of the horn 5, rather than to the tapered portion of the horn. This enables the production cost to be reduced and the flange thickness to be decreased resulting in a higher vibration transmission efficiency.

Although in the described embodiment the horn 5 is made from aluminum without any treatment, the horn 5 may be formed from aluminum with strengthening surface treatment, or form other metals. When the vibrator 4 and the vibration propagation medium 8 are made of glass, any horn material can be used provided that it has a specific impedance approximating that of the glass.

In the described embodiment, the flange 12 is first made separately from the body of the horn 5a and then fixed to the latter. This, however, is not exclusive and the flange 12 may be formed integrally with the body of the horn 5. This enables the horn 5 to be accurately and stably fixed to the holder 13, while reducing the production cost of the horn 5.

In the described embodiment, the horn 5 has a conical or exponential form in order to equalize the driving frequency and the vibration frequency so as to attain resonance. These forms of the horn, however, are only illustrative and various forms of the horn can be employed such as a conical form with a straight portion connected thereto, a stepped conical form, a stepped exponential form, or simple stepped form.

The described example of the horn resonates at $\frac{1}{2}$ wavelength. However, the arrangement may be such that the horn 5 and the vibrator 4 as a unit resonate at the $\frac{1}{2}$ wavelength. It will be clear to those skilled in the art that the form of the horn 5 can be varied in accordance with the value of the driving frequency.

Construction of Pen End

Figure 13:
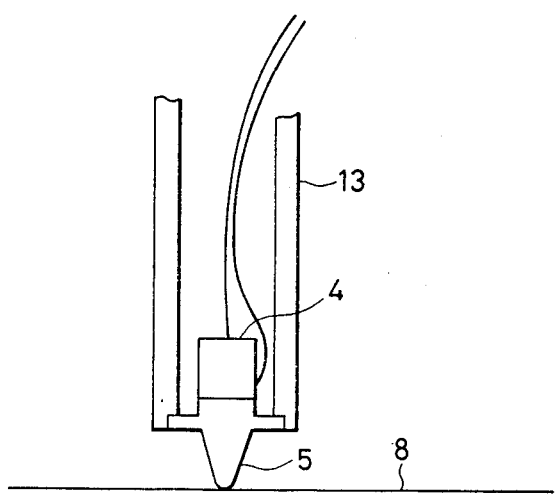
FIG. 13 is a sectional view of the apparatus in a state in which the input pen is pressed to the propagation medium.

Referring now to FIG. 13, the body of the input pen 3 is denoted by a numeral 13. The horn 5 is made of a metal such as aluminum and the vibrator 4 constituted by, for example, a piezoelectric element is disposed in the body 13 and fixed to the end of the horn 5 inside the body 13. As explained before, the horn 5 has a form which enables effective transmission of vibration, e.g., a conical form or a form having an exponential longitudinal section. The material and the shape of the horn 5 are so determined as to enable the horn 5 to resonate at the vibration frequency of the vibrator 4.

The vibration input surface on the end of the horn 5 is rounded as illustrated.

Figure 14:
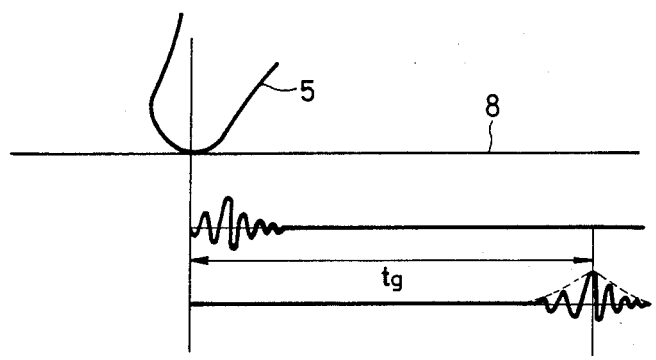
FIG. 14 is an illustration of the end portion of the horn and vibration propagated from the end of the horn.

The curvature of the effective vibration input surface is selected suitably as shown in FIG. 14, in order to meet the required resolution of coordinates detection and in accordance with factors such as the material of the vibration propagation medium.

The curved end of the horn 5 may be provided by grinding the end of the horn 5 or by fixing, by bonding for example, a tip having a curved surface and formed form a material having acoustic impedance approximating that of the horn body, to the end of the horn 5.

According to this arrangement, the vibration input surface of the horn 5 is allowed to contact the vibration propagation medium 8 always at a single point, at whatever angle the input pen 3 may be inclined with respect to the vaibration propagation medium 8. With this arrangement, therefore, it is possible to eliminate any change in the effective vibration input area which inevitably takes place with conventional input pen in which the horn 5 has a flat end surface.

In this arrangement, the contact surface of the horn 5 is curved so that the horn 5 contacts the vibration propagation medium 8 over an area which is smaller than the desired resolution of coordinates detection. Namely, the horn 5 can contact the vibration propagation medium only at a single point as shown in FIG. 14, thus eliminating any risk of input of vibrations of different phases. In consequence, a vibration waveform with no distortion and approximating a single-wavelength waveform can be obtained in the detecting section. This in turn enables the vibration propagation time to be measured accurately, thus contributing to the improvement in the accuracy of coordinates detection.

The curved end surface of the input pen 3 eliminates any change in the contact area of the input pen 3 despite any change in the angle of inclination of the input pen 3, as will be seen from FIG. 14. This eliminates any individual input error attributable to the habit of the operator. It is also to be noted that any fluctuation in the input during inputting of a long continuous curve, due to a change in the angle of inclination of the input pen 3, can be avoided, thereby enabling the coordinates to be input without discontinuity.

Needless to say, the curved end surface of the vibration input surface of the horn 5 is not exclusive and any other suitable form of the pen end can be employed provided that the width or area of the effective vibration input surface is smaller than the required resolution of coordinates detection.

It is also possible to attach the sensors 6 through horns of a construction similar to that described above, so that the transmission of vibration is focused to a single point or spot also at each sensor. Such an arrangement contributes to a further reduction in the distortion of the detected waveform, thereby remarkably improving the accuracy of the coordinates detection.

As will be understood from the foregoing description, the invention provides a coordinates input apparatus in which vibration inputted to a vibration propagation medium from an input pen having a vibration generating element is sensed by sensors provided on the vibration propagation medium, thereby detecting the coordinates of the position appointed by the input pen on the vibration propagation medium, wherein the maximum width of the effective vibration input surface of the input pen contactable with the vibration propagation medium is determined to be smaller than the required resolution of coordinates detection. With this arrangement, it is possible to transmit the vibration from the input pen to the vibration propagation medium only through a restricted spot or point, so that the detection of coordinates can be conducted at a high degree of accuracy,without suffering from any distortion in the waveform of the detection signal.

Waveform of Received Signal

Figure 15:
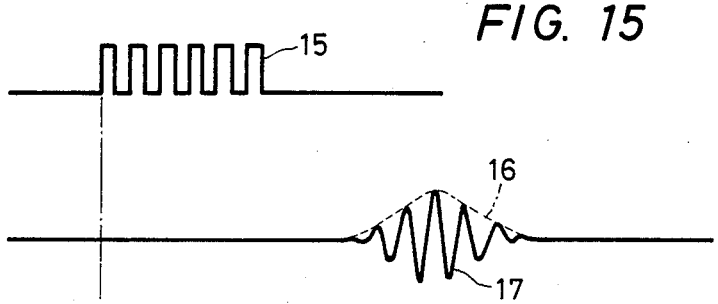
FIG. 15 is an illustration a pulse signal generated from a vibrator drive circuit 2 and the signal sensed by a sensor.

FIG. 15 shows the electric pulse signal generated by the vibrator drive circuit 2 and the waveform of detection signal produced by one 6a of the sensors. Since the waveforms produced by other sensors 6b and 6c are materially the same, only the waveform of the detection signal produced by the sensor 6a is described as a representative.

The vibrator drive circuit 2 delivers a pulse signal 15 consisting of several pulses to the vibrator 4 in the input pen 3. The pulse width is suitably selected in accordance with the resonance frequency of the vibrator 4. The vibrator 4 vibrates in response to the pulse signal 15 and the thus produced vibration is delivered through the horn 5 to the vibration propagation medium 8 so as to propagate through the latter as an elastic wave. The vibration is then detected by the sensor 6a and the delay time, i.e., the time length required till the vibration is detected. In the described embodiment, a plate wave is used as the elastic wave. The use of the plate wave will enable the sensor 6 to sense the vibration wave without being substantially affected by any flaw in the propagation medium 8 and regardless of presence of any matter such as a hand placed on the medium.

In response to the vibration wave, the sensor 6a produces a detection signal which is denoted by 17 in FIG. 15. The broken-line curve 16 shows the envelope curve of the detection signal. The waveform of the detection signal 17 produced in response to the plate wave is not always constant because of difference between the group, velocity and the phase velocity. Namely, the group velocity at which the form of the envelope curve 16 of the detection signal 17 propagates is different from the phase velocity which is the propagation velocity corresponding to the frequency which in turn corresponds to the frequency of the driving signal 15 for driving the vibrator 4. In consequence, the phase of the detection signal 17 varies with respect to the form of the envelope curve 16 depending on the distance between the input pen 3 and the sensor 6a. This means that the detection of the delay time has to be conducted in such a manner as to minimize any error attributable to the difference between the group velocity and the phase velocity.

A detailed description will be made hereinunder as to an example of the method for detecting the delay time.

As explained above, an error corresponding to $\pm \frac{1}{2}$ wavelength is caused depending on what portion of the group of pulses of the detection signal 17 is used as the index of the delay of the time between the moment at which the vibration is input by the input pen 3 and the moment at which the vibration is sensed by the sensor 6.

Figure 16A:
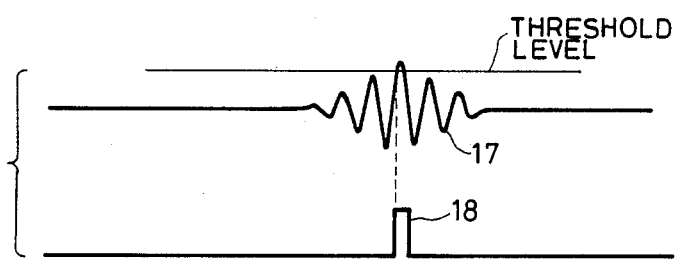
FIGS. 16A and 16B show a modification of the embodiment employing a threshold level for determing the delay time.
Figure 16B:
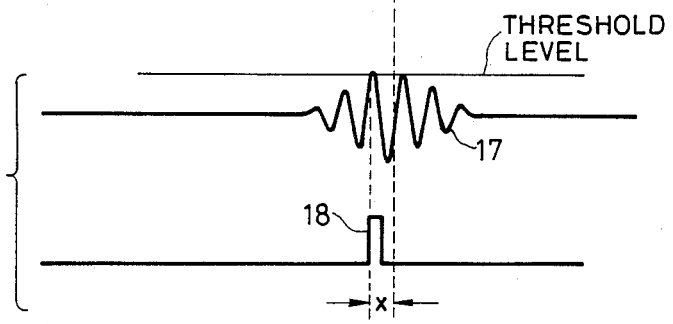

To explain in more detail, an assumption is made that the receive signal is produced by making use of a threshold level of the detection signal 17. FIGS. 16A and 16B show two examples of the detection signal 17. In these Figures, a numeral 18 indicates a received signal of a predetermined duration, produced as a result of comparison of the detection signal 17 with the threshold level. As explained before, the positions (phases) of small waves vary according to the distance between the input pen 3 and the sensor 6a, so that the detection delay time may be changed by a length corresponding approximately to one wavelength, when the receive signal 18 is produced by employing a constant level of the threshold, though the distance of movement of wave in the period corresponding to the change in delay time is small. In the example shown in FIGS. 16A and 16B, an error X (actually a value obtained by subtracting the small distance of movement from the value X) is caused.

In order to eliminate this error, the present invention proposes to determine the position coordinates by detecting the delay time on the basis of both the velocity of the movement of the group of detection waves (group velocity) and the velocity of the detection waves (phase velocity).

More specifically, in this embodiment, the detection of the delay time is carried out by the following method.

Namely, the envelope curve 16 is determined from the detection signal 17, and the peak of the envelope curve is detected. The delay time on the basis of the group velocity till the peak of the envelope curve is detected is represented by Tg. The detected delay time Tg corresponding to the group velocity provides only a small resolution as compared with the detection signal 17, because the delay time Tg is determined for the group of a plurality of waves in the detection signal. The delay time Tg, however, can provide a data which roughly apporximates the distance. In this embodiment, the zero-cross point of the signal wave which is the first one received after the detection of the delay time Tg is detected, and the time length till the moment of detection of this zero-cross point is determined as Tp. It is possible to effect a coordinates detection with reduced error and with high degrees of resolution and accuracy, by computing the coordinates on the basis of both the propagation delay times Tg and Tp obtained by making use of the group velocity and the phase velocity.

Construction and Operation of Received Signal Detection Circuit

Figure 17:
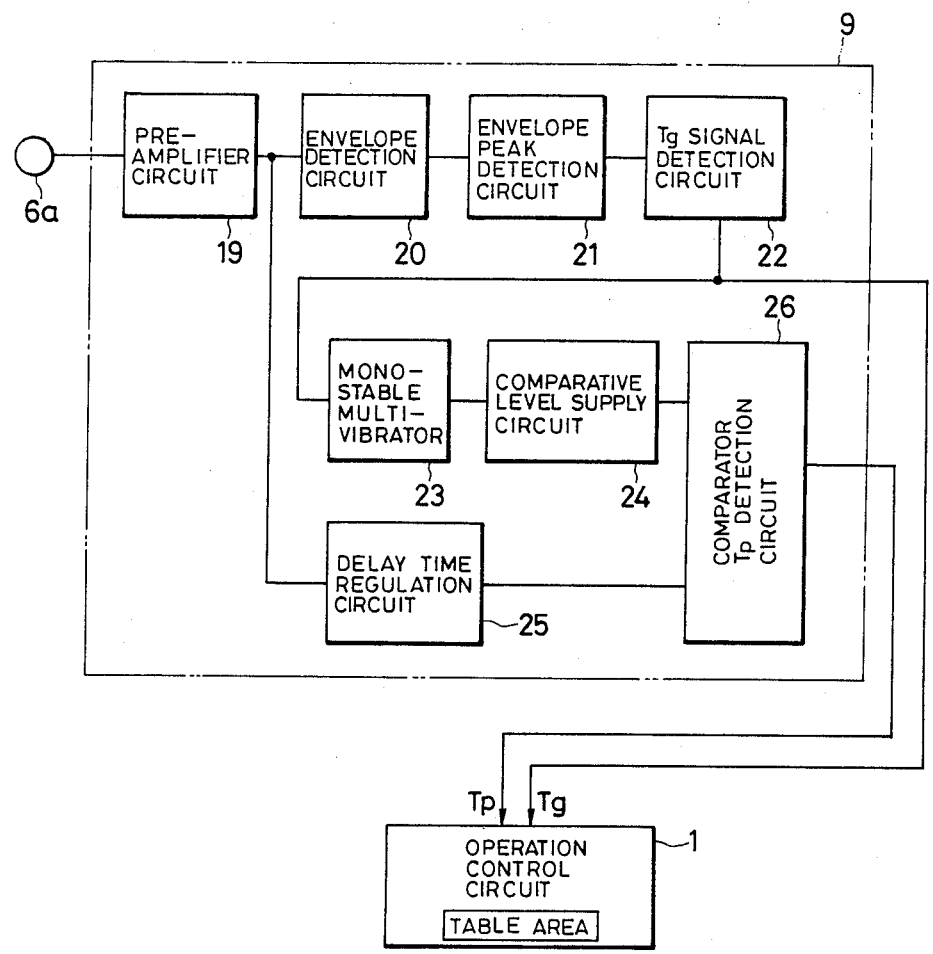
FIG. 17 is an illustration of the internal structure of a received signal detection unit.

FIG. 17 illustrates the internal structure of the received signal detection circuit 9, for use in connection with the sensor 6a. The same circuit arrangement is applied also to other sensors 6b and 6c.

The received signal detection circuit 9 has the following constituents: a pre-amplifier 19 for amplifying the detection signal produced by the sensor 6a; an envelope detection circuit 20 for detecting the envelope of the amplified output from the pre-amplifier 19, e.g., a low-pass filter; an envelope peak detection circuit 21 for detecting the peak of the envelope, e.g., a differential circuit; a Tg signal detection circuit 22 for outputting a signal representing the propagation delay time Tg on the basis of the group velocity as detected by the envelope peak detection circuit 21; a monostable multivibrator 23 adapted to open its gate for a predetermined period after the receipt of the group velocity delay time signal Tg; a comparative level supply circuit 24 for supplying a comparative level to a comparator 26 for the period given by the multi-vibrator; and a delay time regulation circuit for regulating the time so as to compensate for any loss of time incurred during processing of signals in the circuits 20 to 24 mentioned above. The comparator 26 is adapted to compare the signal transmitted from the delay time regulation circuit 25 with the comparative level supplied by the comparative level supply circuit 24, whereby the delay time Tp till the detection of a signal corresponding to the phase velocity is detected.

The process performed by this received signal detection circuit 9 will be described hereinunder with reference to a timing chart shown in FIG. 18.

Driving pulses 50 are generated by the vibrator drive circuit 2 as in the case of the driving pulses 15 shown in FIG. 15. The vibration produced by these pulses is sensed by the sensor 6a and is amplified by the pre-amplifier 19 so that a signal 51 is obtained. This signal corresponds to the detection signal 17 shown in FIGS. 16A and 16B. The amplified signal is then transmitted through the envelope detection circuit 20 for the purpose of detection of the envelope 52 of this detection signal 51. The thus obtained envelope 52 is delivered to the envelope peak detection circuit 20 which conducts a primary differentiation of the envelope 52 thus producing a signal 53 representing the peak of the envelope. Then, a signal 54 is produced in response to the detection of the zero-cross point. The time value Tg till the rise of the signal 54 is detected by the Tg signal detection circuit 22 the output of which is delivered to the operation control unit 1, as well as to the monostable multi-vibrator 23 which in turn produces a pulse signal 55 of a high level and a predetermined duration which is, for example, 1.5 times as long as the phase velocity wavelength.

Then, a pulse signal 56 is produced by the comparative level supply circuit 24 by inverting the pulse signal 55. The signal 56 is delivered to one of the inputs of the Tp detection circuit 26 which is the comparator. Meanwhile, the delay time regulation circuit 25 delivers the detection signal 51 from the pre-amplifier 19 to the other input of the Tp detection circuit 26, with a preset delay time corresponding to the amount of delay caused during signal processing in the above-described circuit elements. The Tp detection circuit 26 produces a signal 57, upon comparing the signal 56 with the detection signal 51. The length of time till the detection of this signal 57 is used as the propagation delay time based on the phase velocity. Then, the position coordinates are computed by making use of both the delay times Tg and Tp.

Figure 19:
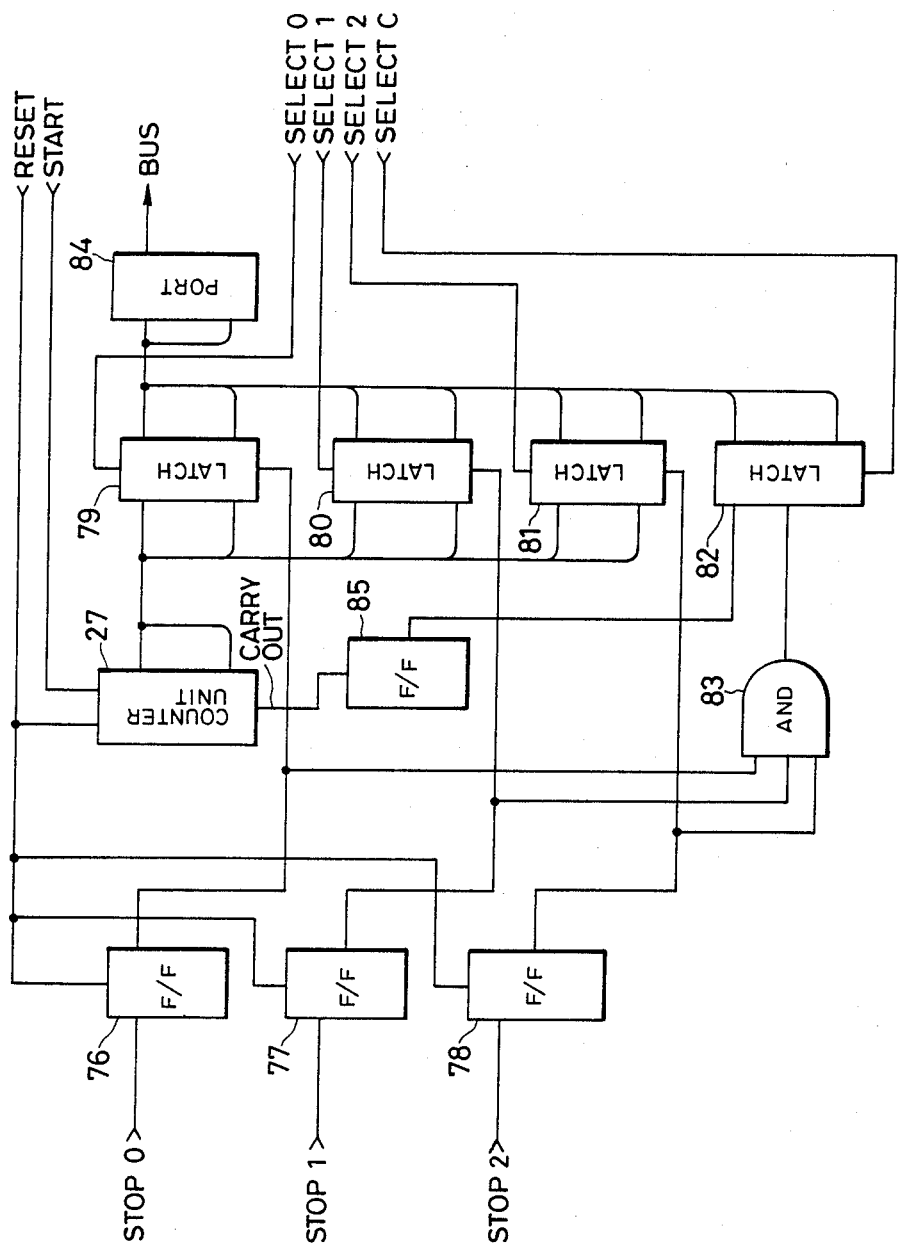
FIG. 19 is an illustration of detail of the delay time regulation circuit 25 in an operation control unit 1.

FIG. 19 shows the detail of the delay time regulation circuit 25 incorporated in the operation control unit 1 of the coordinates input apparatus. A reset signal is derived from a CPU which is not shown, so that the flip-flops 76 to 78 for receiving the detection signals from the received signal detection circuit 9, as well as the counter 27, are reset in response to the reset signal. Subsequently, the counter 27 commences the counting operation in response to a start signal. This start signal is given in synchronism with the driving signal for driving the vibrator 4 of the input pen 3, so that the elastic wave is generated in the propagation medium 8 by the input pen 3 simultaneously with the start of the counting operation. When the elastic wave reach the respective sensors 6, the received signal detection circuit 9 produce detection signals and deliver them to the flip-flops 76 to 78 in accordance with the addresses $S_0$ to $S_2$ of the sensors 6a to 6c. These detection signals are represented by stops 0 to 2. When the signal of the stop 0 is transmitted, a latch 79 latches the content of the counter 27 at this moment. Similarly, the values in the counter corresponding to the times of arrival of the elastic wave at the respective sensors 6 are latched by the respective latches 79 to 81. The AND circuit 83 is adapted for judging whether the detection has been fully completed or not. Upon confirming that all the flip-flops 76 to 78 have delivered the signals, the AND circuit 83 raises a flag in a predetermined bit of a latch 82 for judgment of condition. The CPU detects, by reading the content of the condition judging latch 82, that all the data have been obtained and then reads data through a port 84 by successively selecting the latches 79 to 81. Then, the position coordinates are computed in accordance with these data, as explained before. A reference numeral 85 denotes a time-out flip-flop.

In this arrangement, the maximum value countable by the counter 27 is made to coincide with the maximum delay time. When the longest delay time is over, the carry out of the counter 27 is received by the time-out flip-flop 85 and a flag representing this fact is raised in a predetermined bit of the condition judging latch 82. The CPU judges the condition by checking whether this flag has been raised or not and, upon detecting that this flag has been raised, judges that the input pen has been moved up away from the vibration propagation medium. In such a case, the CPU stops to pickup data and proceeds the process to another control. It is thus possible to effect judgment concerning up and down of the input pen, by making use of the longest delay time.

Figure 20:
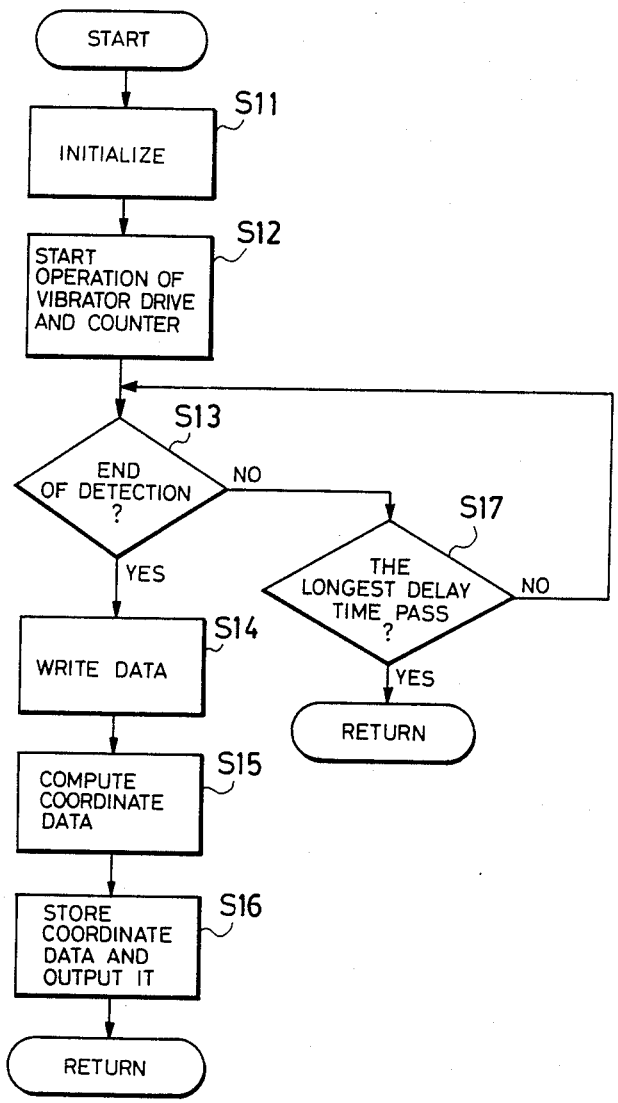
FIG. 20 is a flow chart illustrating the process of operation of the coordinates input apparatus in accordance with the present invention.

FIG. 20 shows a process flow chart of this embodiment of the coordinates input apparatus, stored in the ROM of the operation control unit 1. In Step S11, an initialization is conducted to initialize the internal clock and flip-flops and the driving of the vibrator 4 in the input pen 3 and the counter 27 are started in Step S12. In Step S13, detection signals produced by all sensors 6 in response to the elastic wave are received from the received signal detection circuit 9. Until the end of detection occurs, i.e. while the answer in Step S13 is "no", the process goes to Step S17 to determine whether the longest delay time has elapsed. When no detection signal is received within the period of the longest delay time, i.e. if the answer in Step S17 is "yes", the process returns from this flow and another process is commenced. If the answer in Step S17 is "no", then the process goes back to Step S13. If the end of detection is found in Step S13, i.e. if the answer is "yes", the detection signals are written in Step S14 and the detection signal is received within the period of the longest delay time, the process leaves this flow in Step S17 and another process is commenced. The computation for determining the position coordinates is conducted in step S15. In Step S16, the thus computer position coordinates are stored in the RAM of the operation control unit 1 and are delivered to external devices such as a display drive circuit 10, whereby one cycle of operation is completed. This operation is cyclically executed in accordance with the number of the sampling operations. The delivery of the output to the external device may be conducted such as to display a spot at a position corresponding to the computed position coordinates on the display 11 or to transmit signals corresponding to the computed coordinate values. The series of operation explained above is carried out under the control of the CPU in the operation control unit 1, in accordance with the program stored in the ROM.

In the described embodiment, the judgment concerning up and down of the input pen 3 is conducted by making use of the counter 27 which is intended for measuring the delay time. This, however, is not exclusive and the judgment concerning up and down of the input pen 3 may be conducted by a counter specifically intended for this purpose. It is also possible to raise the flag by making use of the carry out, or to effect an interruption on the CPU. The judgment concerning the state of the pen also may be conducted by the software by making use of the internal clock of the CPU, rather than by the hardware.

As will be understood from the foregoing description, in this embodiment, the state of the pen can be judged by setting the longest delay time. This eliminates the necessity for a switch or the like means on the pen, thus simplifying the construction and improving the reliability and the easiness of use.

Computation of Distance

As explained before, the propagation delay time Tg depending on the group velocity is based upon the envelope 52 of the detection signal, so that the delay time Tg does not provide high accuracy as compared with the delay time computed on the basis of independent wave in the detection signal 51. Therefore, the accuracy of the computation of the distance between the point P where the input pen 3 contacts the propagation medium 8 and the sensor 6 is higher when the computation is conducted on the basis of the propagation delay time Tp computed from the phase velocity detected from one of the waves of the group than when the computation is conducted on the basis of the delay time Tg detected from the envelope 52. Each of the waves in the detection signal 51, however, varies its phase due to dispersion, as explained before.

Figure 18:
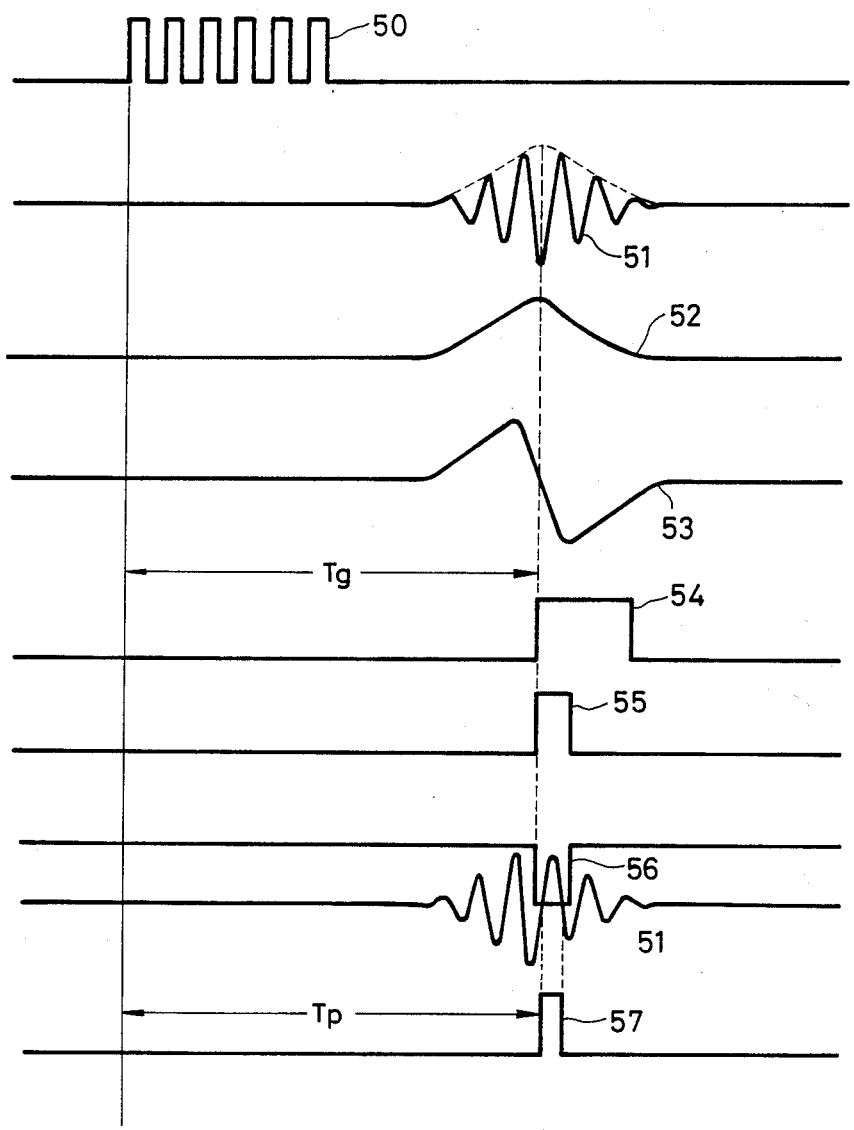
Figure 21:
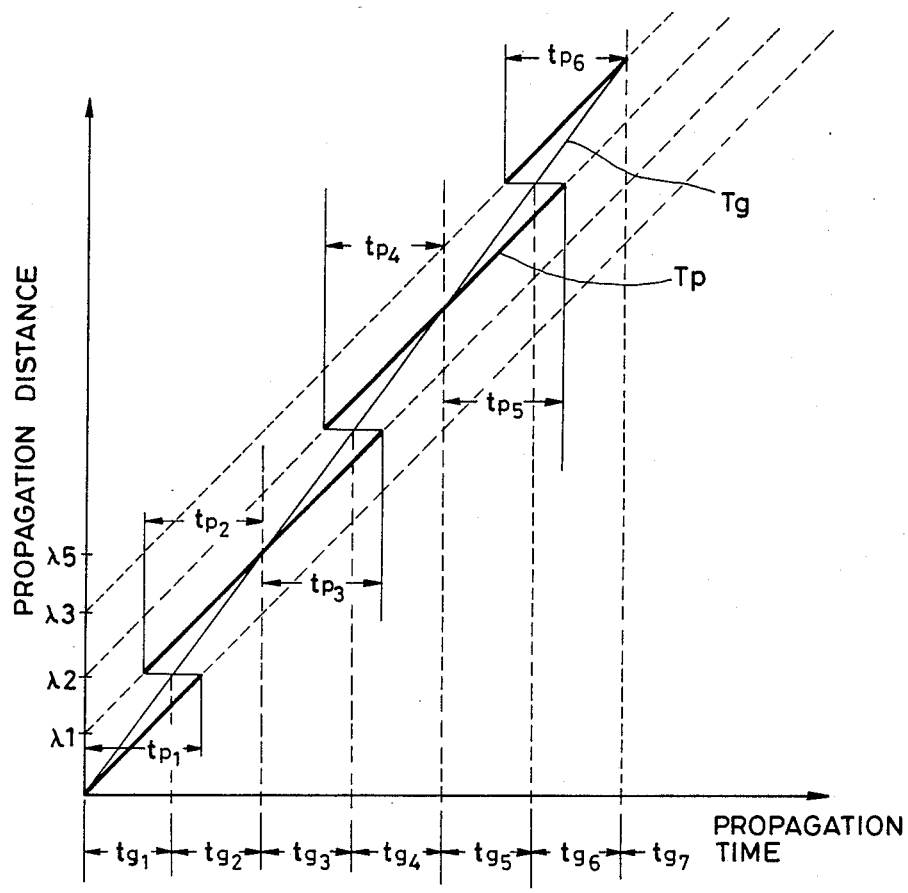
FIG. 21 is a graph illustrating the relationship between the propagation time and the propagation distance using group velocity and phase velocity as parameters.

In FIG. 21, the curve Tp represents the relationship between the propagation distance and the propagation time as obtained when the pulses of the highest peaks in the respective measurements of the detection signal 51 shown in FIG. 18 are detected, while Tg represents the relationship between the propagation distance and propagation time on the basis of the group velocity. The actual relationship on the basis of the group velocity, however, is not linear, because of errors.

Figure 22A:
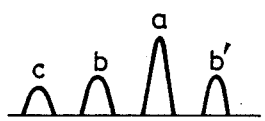
FIGS. 22A to 22C are illustrations of various examples of waveforms in a group of waves.
Figure 22B:
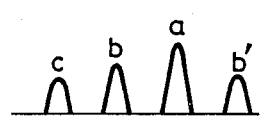
Figure 22C:
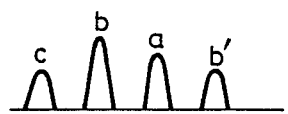

Namely, a continuous movement of the input pan 3 away from the sensor 6a causes the position of the detection signal, as well as the position of the peak in each signal, to change from the state shown in FIG. 22A to the state shown in FIG. 22B and then to the state shown in FIG. 22C. More specifically, though the wave or pulse a exhibits the highest peak at a certain distance, the highest peak is progressively shifted away from pulse a and toward the pulse b. Eventually, the highest peak is exhibited by the pulse c (not shown), as the distance from the sensor 6a is increased. The position of the highest peak in the signal is shifted in the reverse direction when the input pen 3 is continuously moved towards the sensor 6a. This shifting of the highest peak position in the detection signal causes a stepped change of the relationship as shown by the curve Tp in FIG. 21. Similar relationships are observed also with the zero-cross points of the respective pulses a, b and c.

The distance is computed by multiplying the delay time by a certain factor. As will be seen from FIG. 21, therefore, two values of distance are undesirably obtained from a single value of the delay time Tp. It will be understood, however, only one propagation distance is derived if the value of the delay time Tp is read with reference to the delay time Tg. Using the thus read value of the delay time Tp, it is possible to compute the propagation distance with a high level of accuracy, as will be understood from the following description of an example.

It is assumed here that the delay times Tg and Tp are detected as shown in FIG. 21. When the value of the delay time Tg is within a region $tg_1$, a value of Tp within a region $tp_1$ corresponding to this value of Tg is used as the delay time Tp. Similarly, when the value of the delay time Tg falls within a region $tg_2$, a value of Tp within a region $tp_2$ corresponding to this value of Tg is used as the delay time Tp. In this manner, it is possible to obtain a single value of the delay time Tp, by making use of the delay time Tg as a reference, so that the distance can be computed from this value of delay time Tp.

Namely, in FIG. 21, representing the propagation distance by r, the wavelength of each wave of the detection signal (phase velocity) by λ and the phase velocity by vp, the following condition is met and the distance r can be computed in accordance with this condition.

$$r = v_p + T_p + n.\lambda \quad (7)$$

where, n is an integer determined beforehand as follows.

When value of Tg falls within range of $tg_1$: $n=0$
When value of Tg falls within ranges of $tg_1$ and $tg_2$: $n=1$
When value of Tg falls within ranges of $tg_3$ and $tg_4$: $n=2$ Practically, the values of distance r computed in accordance with the above formula using the measured values of Tg and Tp are stored in a table set in the operation control unit 1. In operation, the operation control unit 1 computes the distance r by converting the measured value of Tg into the integer n in accordance with the content of the table, and substituting the respective values of parameters such as vp, Tp, n and λ into the formula (7). Then, the x and y coordinates are computed by substituting the values of propagation distances to the sensors 6a to 6c to the formula (2) mentioned before.

Other Embodiments

The embodiment shown in FIGS. 4A to 4C makes use of a table (see FIG. 1) storing the relationships between the value of delay time computed on the basis of group velocity and the value of the integer n, and the computation of the distance is carried out by utilizing the values of n stored in the table, in accordance with the value of the delay time Tg obtained on the basis of the group velocity. This embodiment, therefore, requires a large capacity of memory due to the employment of the table. In addition, table has to be completely altered when the constants are changed. Thus is quite inconvenient from the view point of calibration.

It is to be noted that the condition as shown in FIG. 21 is unreal. The propagation time actually cannot be reduced to zero. In other words, a certain time propagation or response time is required even then the distance is zero. Thus, the characteristic curves cannot pass the origin of the graph.

In another embodiment, therefore, the following computation formulae are employed, so as to facilitate the calibration even in the case of alteration of the constants.

The group delay time tg, phase delay time tp, group velocity vg, phase velocity vp and the wavelength $\lambda_p$ are related to the distance r as shown by the following formulae (8) and (9).

$$r = v_g t_g \quad (8)$$

$$r = v_p t_p + n\lambda_p \quad (9)$$

From the formulae (8) and (9), the value of the integer n is derived as expressed by the following formula (10).

$$n = [(v_g t_g - v_p t_p / )/\lambda_p] \quad (10)$$

The value n is a positive integer which may be zero. In formula (10), the delay time tg involves an error of a certain range. Representing this error by $1/N\lambda_p$, where N is a real number other than 0, the integer n is given by the following formula (11).

$$n = [(v_g t_g - v_p t_p)/\lambda_p + 1/N] \quad (11)$$

In formula (11), the value N is set at 2.0 and the digits below the decimal point in the calculation result of the right side of formula (11) are rounded off. If the delay time tg thus computed fluctuates within the range of ±½ period, it is possible to compute the value of the integer n. The value N may be determined in accordance with the deviation of fluctuation of the delay time tg.

Figure 23:
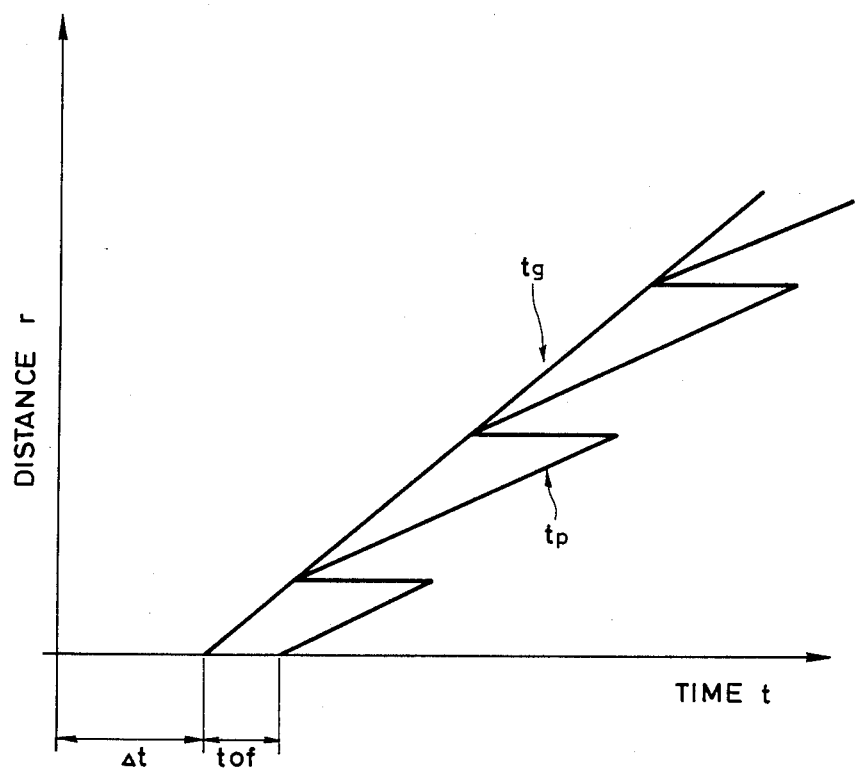
FIG. 23 is a graph similar to the graph shown in FIG. 21 showing the relationship between the propagation time and the propagation distance using group velocity and phase velocity as parameters.

Referring further to formula (11), tg and tp have a delay time Δt and an offset time $t_{of}$, as shown in FIG. 23. The detection result will therefore involve some error, unless these delay time Δt and an offset time $t_{of}$ are eliminated. The integer n, after correction for eliminating the delay time Δt and an offset time $t_{of}$ from the delay times tg and tp, can be expressed by the following formula (12).

$$n = [(v_g(tg - \Delta t) - v_p(tp - \Delta t - t_{of}))/\lambda_p + 1/N] \quad (12)$$

The correction for eliminating the delay time Δt and an offset time $t_{of}$ also can be effected on formula (9) as follows.

$$r = n\lambda_p + v_p(tp - \Delta t - t_{of}) \quad (13)$$

The terms containing errors are corrected by substituting the value n determined by the formula (12) into the formula (13), so that the distance r between the input pen 3 and the sensor 6 can be determined with a high degree of accuracy peculiar to the phase delay.

Representing the error term by terrg.p, the following formula (17) is derived from formulae (12) and (13).

$$\begin{aligned} r &= f(v_g, tg, v_p, tp, \lambda_p, terrg \cdot p) \\ &= n\lambda_p + v_p(tp - terrp) \end{aligned} \quad (17)$$

where, n is given by the following formula:

$$n = [(v_g(tg - terrg) - v_p(tp - terrp)/\lambda_p + 1/N]$$

In addition, digits below the decimal point in the term within [ ] are rounded off, and assumptions are made as follows:
N≧1,
terrg=Δt, terrp=Δt+$t_{of}$ Thus, the error term terrg.p is composed of a component Δt which is the physical delay from the moment of rise of the driving signal for vibrating the input pen 3 till the detection of vibration by the sensor 6, including factors such as the delay in the circuit and the time required for the vibration energy to pass through the horn of the input pen, and a component $t_{of}$ which corresponds to the phase offset. In the operation control circuit, the distance r is determined in accordance with the formulae (13) and (17) above.

As has been described, according to the invention, the position coordinates are computed by measuring both the group velocity and the phase velocity caused by the dispersion of the plate wave, so that the resolution (accuracy) of the coordinates input apparatus, which is typically a digitizer, can be improved advantageously. In addition, it is possible to obtain a transparent digitizer of the type in which the input and output devices are united.

It is also to be noted that the coordinates input apparatus of this embodiment makes it possible to easily cope with the demand for alteration of constants of other factors, because the distance between the input pen and the sensor is determined in accordance with a predetermined formula on the basis of both the group velocity and the phase velocity. In addition, correction of eliminating influence of delay and offset can be effected without difficulty.

In this embodiment, by providing a detection window constituted by a monostable multi-vibrator and a comparative level supply circuit, thus ensuring high accuracy of detection of position coordinates without being affected by detection error.

Furthermore, it is possible to detect the group delay time Tg and the phase delay time Tp from the envelope and the detected signal, respectively, at a high level of accuracy by virtue of the provision of the delay regulation circuit.

In this embodiment, the detection of the phase delay time Tp is executed not by sensing the peak of the detection signal but by sensing a zero-cross point. In consequence, the phase delay time Tp can be detected with high degree of accuracy without suffering from influences of contact pressure and the S/N ratio of the detection signal which inevitably affect the detection in the known apparatus in which the phase delay time is detected by sensing the peak of the detection signal. This contributes to a further improvement in the accuracy of detection of the position coordinates.

Other Examples of Received Signal Detection Circuit and Operation Thereof

In the embodiments described before, the envelope 16 of the detection signal is subjected to a first-order differentiation for the purpose of determining the group delay time and then the delay time Tp on the basis of the phase velocity is determined by sensing the zero-cross point. This operation, however, is only illustrative and the detection of the received signal can be conducted in different manners.

For instance, in another form of the received signal detection circuit, the detection signal 17 is subjected to a second-order differentiation and the zero-cross point of the waveform generated by the second-order differentiation is detected. Such an operation provides a steeper slope of the curve and, hence, a higher accuracy of detection as compared with the foregoing embodiments in which only a first-order differentiation is conducted to detect the peak of the envelope 16.

Figure 24:
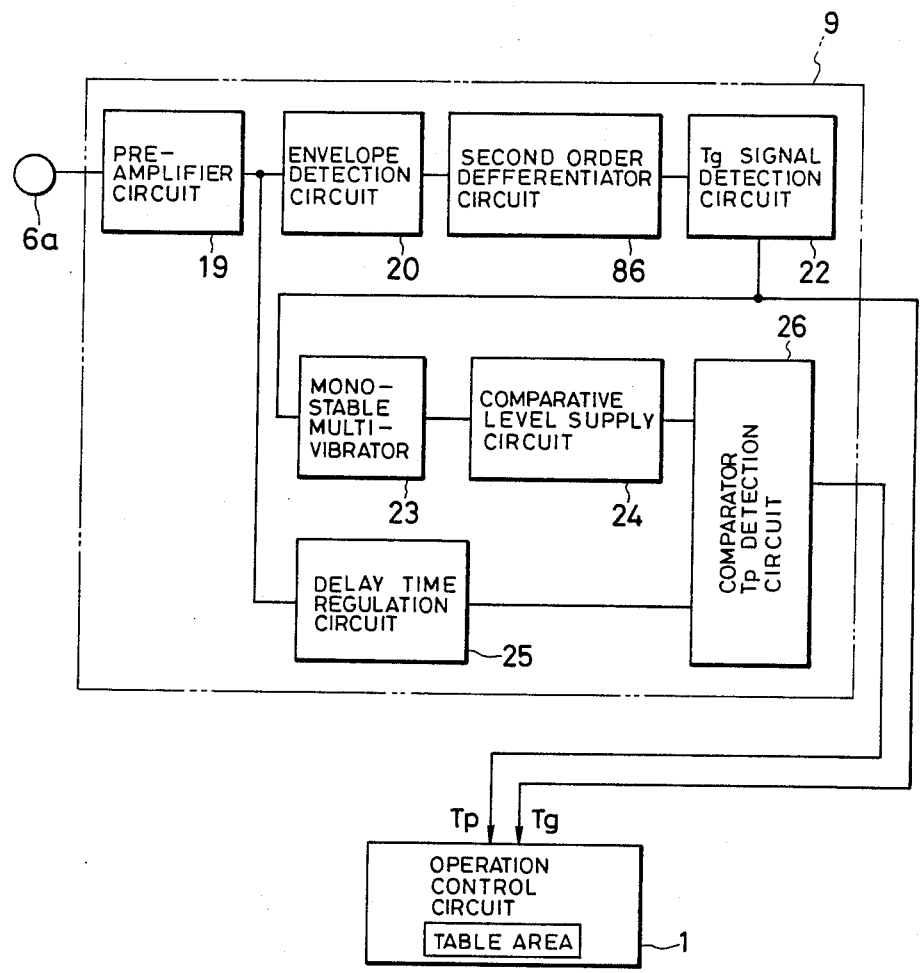
FIG. 24 is an illustration similar to FIG. 17, showing the internal structure of a received signal detection unit.
Figure 25:
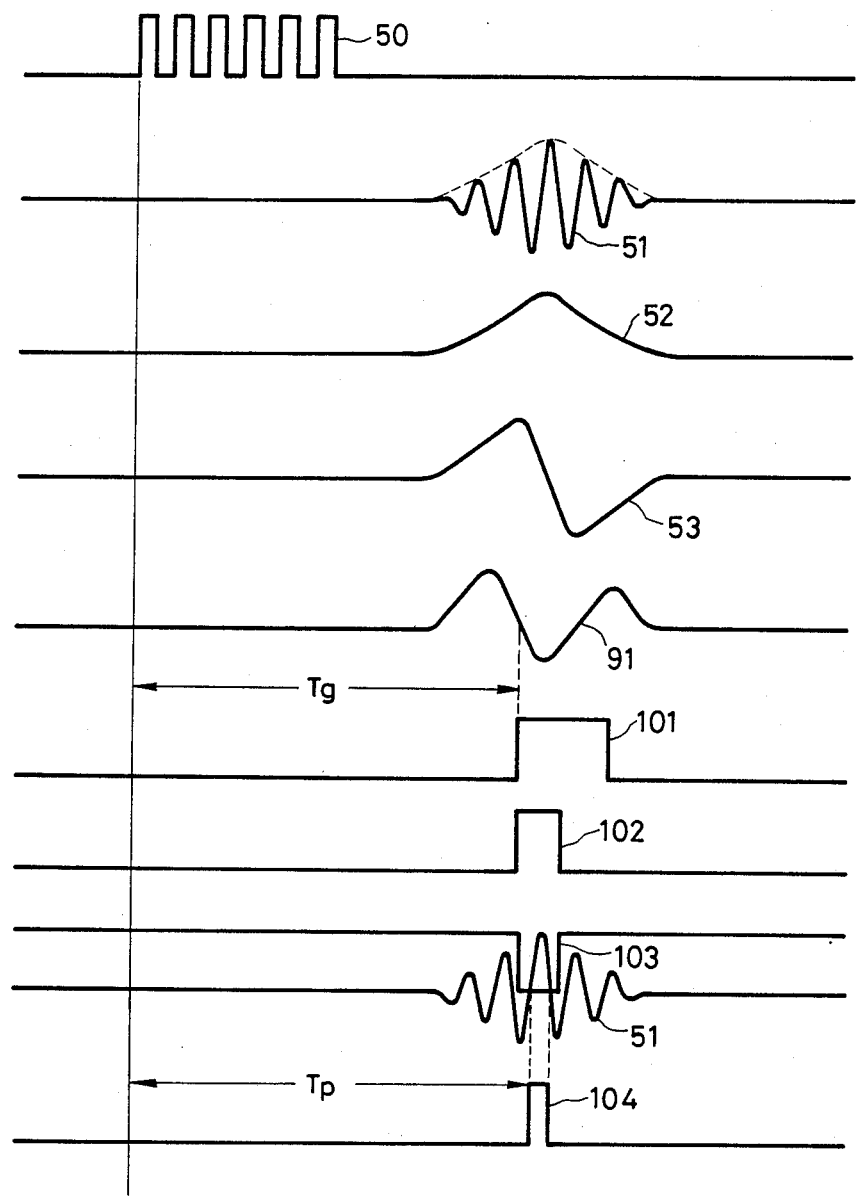

An example of the arrangements for conducting such an operation will be described hereinunder with reference to FIGS. 24 and 25. FIG. 24 is an illustration of the internal structure of another example of the received signal detection circuit 9, while FIG. 25 is a timing chart illustrative of the operation of this circuit.

This received-signal detection circuit includes a second-order differentiator circuit 86 adapted for effecting a second-order differentiation on the envelope of the detection signal. This circuit further employs various constituents which are the same as those employed in the circuit explained before in connection with FIG. 17 and, hence, denoted by the same reference numerals.

In operation, the envelope 52 of the detection signal generated in the envelope detection circuit 20 is subjected to the second-order differentiator circuit 86 which then produces a signal waveform 53 through a first-order differentiation and then produces a waveform 91 through a second-order differentiation. In order to detect the zero-cross point of the second-order-differentiated waveform 91, a signal 101 is produced by the Tg signal detection circuit 22. This signal 101 is delivered to the operation control unit 1 and also to the monostable multi-vibrator 23 so as to produce a high-level pulse signal 102 of a predetermined duration. Subsequently, a pulse signal 103 is formed in the comparative level supply circuit 24 by inverting the pulse signal 102, and the thus produced pulse signal 104 is input to one of the inputs of the Tp detection circuit which serves as a comparator. Meanwhile, the delay time regulation circuit 25 delivers the detection signal 17 from the preamplifier 19 to the other input of the Tp detection circuit 26, with a predetermined time delay amounting to the delay incurred during processing of the signal through various circuits mentioned above. The Tp detection circuit 26 compares the signal 103 with the detection signal 17 and produces a signal 104. The time length till this signal 104 is detected is used as the propagation delay time based on the phase velocity. In this embodiment, the position coordinates are computed by making use of both the delay time Tg and the delay time Tp. The computing method is materially the same as that described before in connection with the preceding embodiments, so that detailed description thereof is omitted.

As will be understood from the foregoing description, this embodiment of the invention makes use of a plate wave elastic wave. This wave provides, due to dispersion peculiar to this type of wave, the group velocity and phase velocity of the elastic wave both of which are measured and used in the computation of the position coordinates. It is therefore possible to attain a high resolution (accuracy) of position detection performed in the coordinates input apparatus which is typically a digitizer. In addition, it becomes possible to produce a digitizer of the type in which the input and output devices are constructed as a unit, by making use of a transparent vibration propagation medium such as a glass.

It is also possible to store, in the form of a table, the relationship between the factors Tg, Tp and l, within the table area in the operation control unit 1 shown in FIG. 1. The use of such a table eliminates the necessity for complicated computation so that the signal processing time is shortened while assuring a high degree of accuracy of position detection.

The monostable multi-vibrator 23 and the comparative level supply circuit 24 in combination constitute a detection window in the received signal detection circuit 9. This detection window serves to ensure a high degree of accuracy of position detection while eliminating unfavorable effects of errors. The use of the delay time regulation circuit 25 enables the delay times Tg and Tp to be accurately detected from the envelope and the detection signal wave, thus contributing to a further enhancement of accuracy in the detection of position coordinates.

In this embodiment, the delay time Tp on the basis of the phase velocity is detected by detecting the zero-cross point, thus eliminating various unfavorable effects which are inevitably produced due to factors such as the pen contact pressure and S/N ratio in the known apparatus designed for detecting the peak of the signal.

The provision of the delay time regulation circuit is not essential. Namely, this circuit can be dispensed with provided that the multiplication by the coefficient corresponding to the delay time is beforehand conducted in the operation control unit 1.

In a different form of this embodiment, the relationships between the delay times Tg and Tp are beforehand stored in the form of a table, and a value Tg' of the time delay of a higher accuracy is derived from the table by making use of the value of the delay time Tp which inherently has a high accuracy. Since the values Tg and Tg' are on a continuous line, it is possible to directly compute the x and y coordinates from the thus determined delay time value Tg'.

Other Embodiments

In a different embodiment of the present invention, the waveform of the vibrator drive signal (driving pulse signal) is suitably modulated in the vibrator drive circuit 2 shown in FIG. 1 so that a plurality of peaks may appear in the detection signals, i.e., the output signals from the sensors. In operation, the first peak is detected and the signal produced in response to detection of the first peak is utilized in place of the delay time Tg in the foregoing embodiments, as the signal representative of the group propagation delay time Tg. Then, the phase propagation delay time Tp is detected in the same way as the foregoing embodiments and the position coordinates are computed by making use of these values of delay time Tg and Tp.

Figure 26:
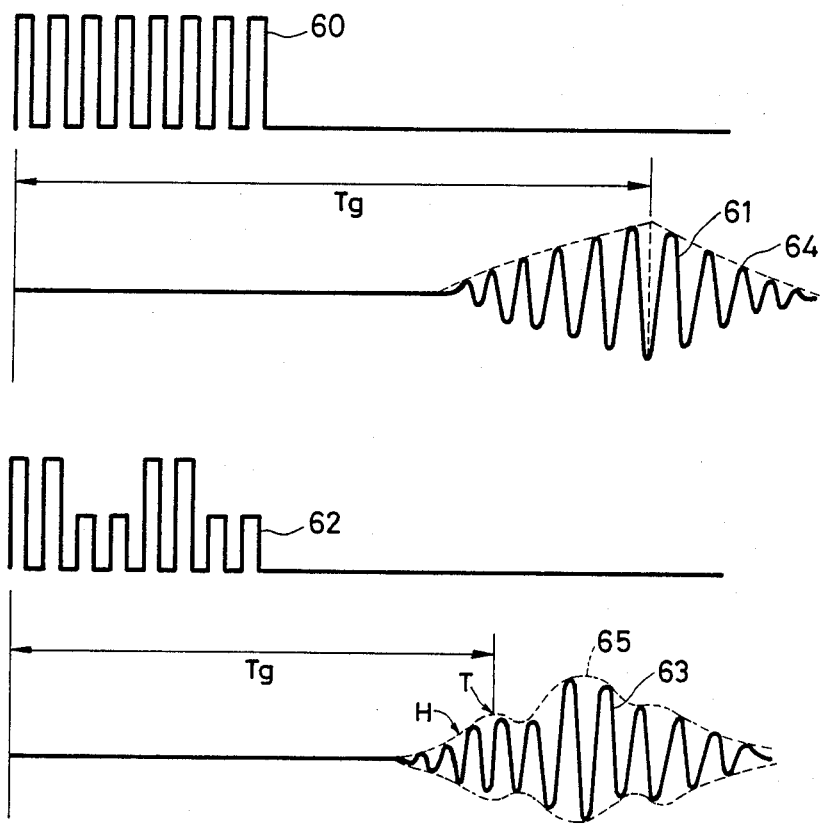
FIG. 26 is a illustration of detection signals as obtained when a modulation is effected in the driving pulses and when no modulation is effected, respectively.

Referring now to FIG. 26, the waveform of ordinary pulse signals for driving the vibrator, similar to the driving pulses shown in FIG. 15, are denoted by a numeral 60. The vibration produced by the vibrator 4 by the driving pulses 60 and then transmitted to the vibration propagation medium is then propagated through the latter and is sensed by the sensor 6. Upon sensing the vibration, the sensor produces a detection signal 61 shown in FIG. 26. In the embodiments described before, the group propagation delay time Tg is detected by sensing the peak of the envelope 64 of this detection signal 61 and the phase propagation delay time Tp is detected in accordance with the value of the group propagation delay time Tg, followed by computation of the position coordinates which is conducted by making use of both the delay times Tg and Tp. In contrast, in the embodiment under description, the vibrator driving pulses are suitably modulated as shown by 62 in FIG. 26. When the vibrator 4 of the input pen 3 is driven by this modulated driving signal, the detection signal produced by the sensor 6 exhibits a waveform as shown by 63 in FIG. 26.

The thus obtained detection signal 63 is supplied to the received signal detection circuit 9 which may be of the type shown in FIG. 24 so as to be differentiated, whereby the first zero-cross point, i.e., the peak point T, is detected. The signal produced in response to this zero-cross point is used as the signal representative of the group propagation delay time Tg. Then, the signal representing the phase propagation delay time Tp is detected in the manner described before, and the computation is performed by the operation control unit 1 so that the position coordinates are determined with high degree of accuracy from the values of Tg and Tp.

The modulation of the vibrator driving signal produces an advantageous effect in that the region influenced by the reflection from the end surface of the propagation medium 8 or from the surface of the anti-reflection member 7 can be reduced. Namely, when the detection signal has the waveform as indicated by 61 in FIG. 26, the reflected wave is superposed to the trailing end of the detected wave so that the waveform of the detection signal is undesirably disturbed, with the result that the group propagation delay time Tg and the phase propagation delay time Tp cannot be detected accurately. In order to minimize the influence of the reflected wave, therefore, it is preferred that the propagation times Tg and Tp are detected from a portion of the detection signal near the leading end thereof. In this embodiment, the first peak in the detection signal appears at a portion of the detection signal near the leading end thereof, as is the case of the detection signal 63, by virtue of the use of the modulated driving signal 62. It is, therefore, possible to accurately detect the position coordinates without being influenced by the reflection of the vibration wave. Needless to say, the point of detection of the propagation time Tg can further approach the leading end of the detection signal 63, by subjecting the envelope 65 to a second-order differentiation and using the first zero-cross point, i.e., the first inflection point H, as the propagation time Tg.

In addition, even the anti-reflection member 7 cannot perfectly absorb the reflected waves. Some are reflected by the anti-reflection member 7 and the waveform of the detection signal is influenced by the reflection.

Figure 27:
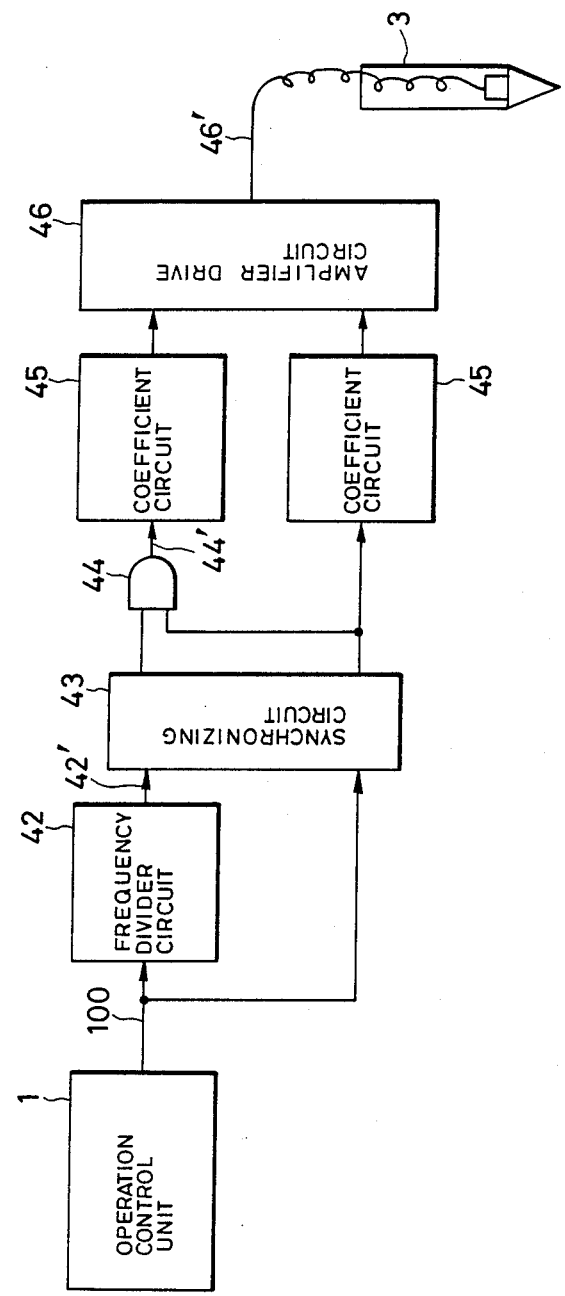
FIG. 27 is an illustration of the circuit arrangement of the vibrator drive circuit employed when a modulating process is adopted.
Figure 28:
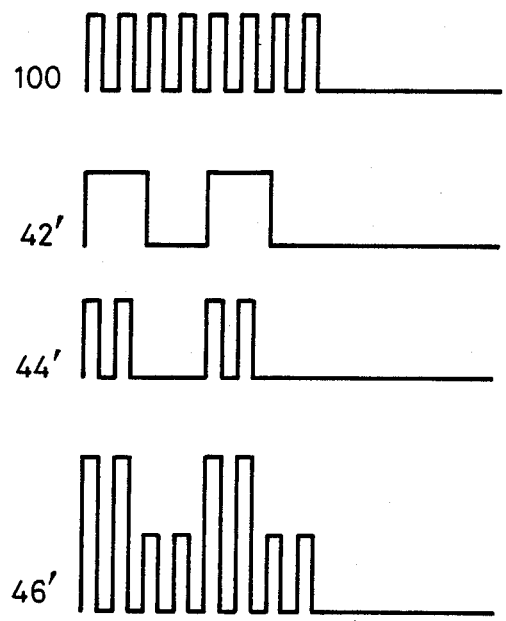
FIG. 28 is a timing chart showing various signals obtained in the vibrator driving circuit.

FIG. 27 shows an example of the construction of a vibrator drive circuit 2 suitable for use in executing the modulation of the driving signal. Referring to this Figure, the operation control unit 1 delivers a vibrator driving signal 100 to the vibrator drive circuit 2. The vibrator driving signal 100 is a pulse signal having a waveform as shown in FIG. 28. The signal 100 is delivered to a frequency-dividing circuit 42 which demultiplies the driving signal 100 by 4 so as to produce a signal 42' having a waveform as shown in FIG. 28. A reference numeral 43 denotes a synchronizing circuit which equalizes the timings of rise of the signals 100 and 42'. An AND (logical product) circuit 44 is adapted to provide the logical product (AND) of the signal 100 and 42' thereby producing a signal 44' having a waveform as shown in FIG. 28. Coefficient circuits 45 are adapted for amplifying the signals 44' and 100 at different predetermined amplification factors. An amplifier drive circuit 46 adds the outputs from these two coefficient circuits 45 and amplifies the sum to the level of the driving voltage, thereby producing the drive signal 46' (see FIG. 28) for driving the vibrator 4 of the input pen 3. Examples of the modulated driving signal waveform are shown at 63 in FIG. 26 and at 46' in FIG. 28. These patterns of modulation, however, are not exclusive and the advantage of this embodiment is obtainable even with other patterns of modulation of the driving signal.

In a different form of this embodiment, the relationships between the delay times Tg and Tp are beforehand stored in the form of a table, and a value Tg' of the time delay of a higher accuracy is derived from the table by making use of the value of the delay time Tp which inherently has a high accuracy. Since the values Tg and Tg' are on a continuous line, it is possible to directly compute the x and y coordinates from the thus determined delay time value Tg'.

It is also possible to detect the group velocity by sensing the zero-cross point of a signal obtained by a second-order differentiation of the envelope of the detection signal as shown in FIGS. 24 and 25, instead of detection of the peak of the envelope. The second-order differentiation provides a steeper slope of the curve for the detection of the delay time and, hence, a higher degree of accuracy, as compared with the case where the zero-cross point is sensed by a first-order differentiation, i.e., the case where the peak of the envelope is detected. The detection method relying upon the sensing of the peak of the envelope tends to be affected by various factors such as the pen contact pressure and the S/N ratio of the detection wave. The method relying upon the sensing of the zero-cross point in second-order differentiation enables the phase delay time Tp to be detected without being affected by such factors.

In this embodiment, a high resolution is obtained because the position coordinates are computed on the basis of both the group velocity and the phase velocity which are produced as a result of dispersion of the plate wave of the elastic wave. In addition, the driving signal for driving the vibrator of the input pen is modulated so that the first inflection point in the detection signal waveform derived from the detection means appears in the vicinity of this waveform, thus reducing any tendency for the detection of the inflection point to be affected by reflected wave. This in turn makes it possible to reduce the distance between the reflecting surface and the detection point, so that the coordinates input apparatus can have a widened effective detection area over which the position coordinates can be detected accurately.

It is also possible to store, in the form of a table, the relationships between the factors Tg, Tp and L. The use of such a table shortens the signal processing time while a high degree of accuracy of position detection is assured.

The monostable multi-vibrator and the comparative level supply circuit in combination constitute a detection window which serves to ensure a high degree of accuracy of position detection while eliminating unfavorable effects of errors. The use of the delay time regulation circuit enables the delay times Tg and Tp to be accurately detected from the envelope and the detection signal wave, thus contributing to a further enhancement of accuracy in detection of position coordinates.

In this embodiment, the delay time Tp on the basis of the phase velocity is detected by detecting the zero-cross point rather than the peak point, thus eliminating various unfavorable effects which are inevitably produced due to factors such as the pen contact pressure and S/N ratio in the known apparatus designed for detecting the peak of the signal.

In this embodiment, when the measured delay times $t_0$, $t_1$ and $t_2$ respectively involve errors $d_0$, $d_1$ and $d_2$ the coordinate values computed in accordance with the formulae mentioned before contain the following errors for the coordinates x and y, respectively:

$$\text{For } x: V_k^2\{(d_0^2 - d_1^2) + 2(t_0 d_0 - t_1 d_1)\}/2X \quad (14)$$
$$\text{For } y: V_k^2\{(d_0^2 - d_2^2) + 2(t_0 d_0 - t_2 d_2)\}/2Y$$

As will be seen from the second term of each part of formula (14), the value of the error involved varies depending on the delay time, i.e., depending on the distance from the sensor. More specifically, the error is increased and, hence, the detection accuracy is decreased as the delay time and, hence, the distance are increased.

Figure 29:
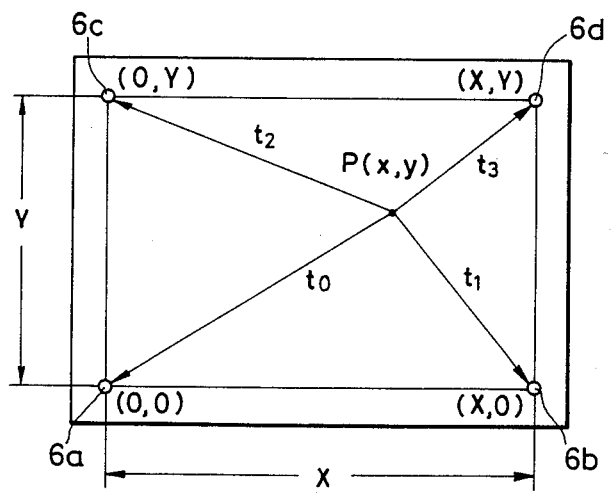
FIG. 29 is an illustration of the example in which sensors are disposed at four positions.

FIG. 29 illustrates the input section of this embodiment of the coordinates input apparatus in accordance with the present invention. This embodiment employs an additional sensor 6d. The propagation delay time corresponding to the distance between the appointed point P and the sensor 6d is represented by $t_3$. Other portions are materially the same as those in FIG. 2.

In operation, the elastic wave generated at the appointed point P first reaches the sensor 6d and the sensors 6b, 6c and 6a are reached in the mentioned sequence. In consequence, the following condition is met:

$$t_3 \leq t_1 \leq t_2 \leq t_0 \tag{15}$$

The error involved in the result of computation of coordinates is increased as the delay time becomes longer. Therefore, in this embodiment, the coordinates computation is executed by employing only three earlier data: namely, the data which is delivered first, second and third.

The computation of coordinates is conducted in accordance with the following formula:

$$\begin{aligned} x &= X/2 + (S_x)V_k^2(t_a + t_b)(t_a - t_b)/2X \\ y &= Y/2 + (S_y)V_k^2(t_a + t_c)(t_a - t_c)/2Y \end{aligned} \tag{16}$$

where, x and y represent the coordinates of the point appointed by the input pen 3, $S_x$ and $S_y$ represent variables indicative of the signs of the respective formulae and $t_a$, $t_b$ and $t_c$ represent the delay times determined in accordance with the sequence of arrival of the elastic wave. The factors $S_x$, $S_y$, $t_a$, $t_b$ and $t_c$ are determined by the software by sensor which provides the minimal delay time, in accordance with the following table.

|          | $S_x$ | $S_y$ | $t_a$ | $t_b$ | $t_c$ |
|----------|-------|-------|-------|-------|-------|
| $S_0(t_0)$ | +1 | +1 | $t_0$ | $t_1$ | $t_2$ |
| $S_1(t_1)$ | −1 | +1 | $t_1$ | $t_0$ | $t_3$ |
| $S_2(t_2)$ | +1 | −1 | $t_2$ | $t_3$ | $t_0$ |
| $S_3(t_3)$ | −1 | −1 | $t_3$ | $t_2$ | $t_1$ |

Figure 30:
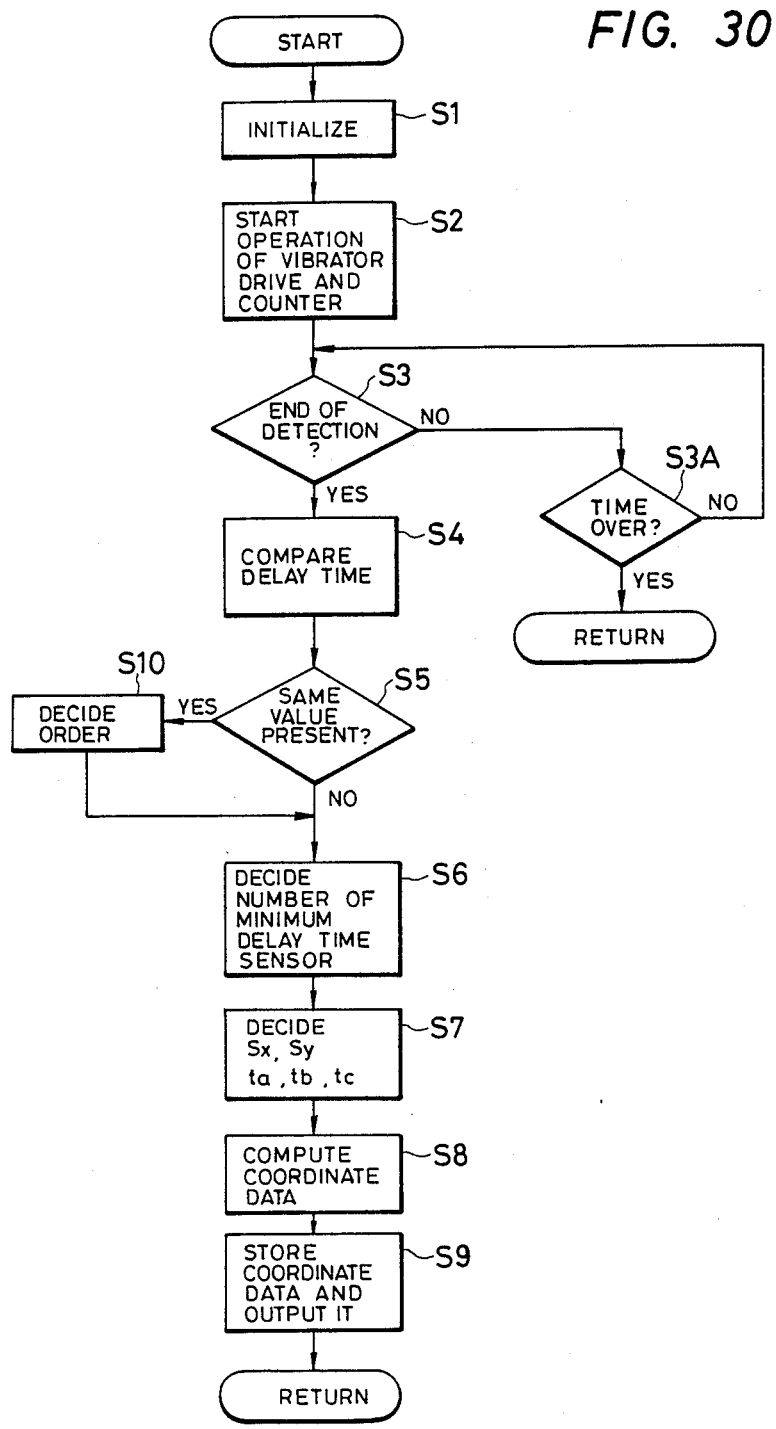
FIG. 30 is a flow chart of the control process performed in an embodiment of the invention.

FIG. 30 is a flow chart showing the process performed by the coordinates input apparatus of the present invention. This process flow is stored in a ROM.

In Step S1, an initialization is conducted to initialize the internal clock and the flip-flop and so forth. In Step S2, the drive of the vibrator of the input pen 3 and the counter are started. In Step S3, detection signals representing the detection of the elastic wave from all the sensors are received from the received signal detection circuit 9. Until the end of detection occurs, i.e. while the answer in Step S3 is "no", the process goes to Step S3A to determine whether the predetermined time has elapsed. When no detection signal is received within the predetermined time, i.e. if the answer in Step S3A is ∓yes", the process returns from this flow and another process is commenced. If the answer in Step S3A is "no", then the process goes back to Step S3. If the end of detection occurs in Step S3, that is, if the answer is "yes", the process goes to Step S4. In Step S4, the delay times are compared and an order is given to the sensors such that the sensor which has produced the shortest delay time comes first. If two or more sensors have delivered the same delay time i.e., if the answer in step S5 is "yes", the process proceeds from Step S5 to Step S10 in which the order is determined by a predetermined rule such that, for example, the sensor having the smallest serial No. comes has the priority. If the answer in Step S5 is "no", the process goes directly to Step S6. When the sensor which has given the shortest delay time is determined in Step S6, the process proceeds to Step S7 in which the factors $S_x$, $S_y$, $t_a$, $t_b$, $t_c$ are determined in accordance with Table 1, and the computation of coordinates is conducted in Step S8. Then, in a subsequent Step S9, the coordinates are stored in the RAM and, at the same time, delivered to an external device such as a display 11, thus completing one cycle of operation. Then, the above-described flow is repeated in accordance with the number of the sampling cycles. The delivery of the coordinates to the external device such as the display 11 may be conducted in such a manner as to enable the display 11 to display a spot at a position on the display 11 or to deliver numerical values representing the coordinates. The above-described operation is controlled and executed by the CPU of the operation control unit, in accordance with a program stored in the ROM.

Although in the described flow of the process the delay times given by all the sensors are compared to determine the order for all the sensors by a software, this is not exclusive and the order may be determined by a hardware. It is also possible to arrange such that the computing operation is commenced when the delay times are obtained from first, second and the third sensors.

Figure 31:
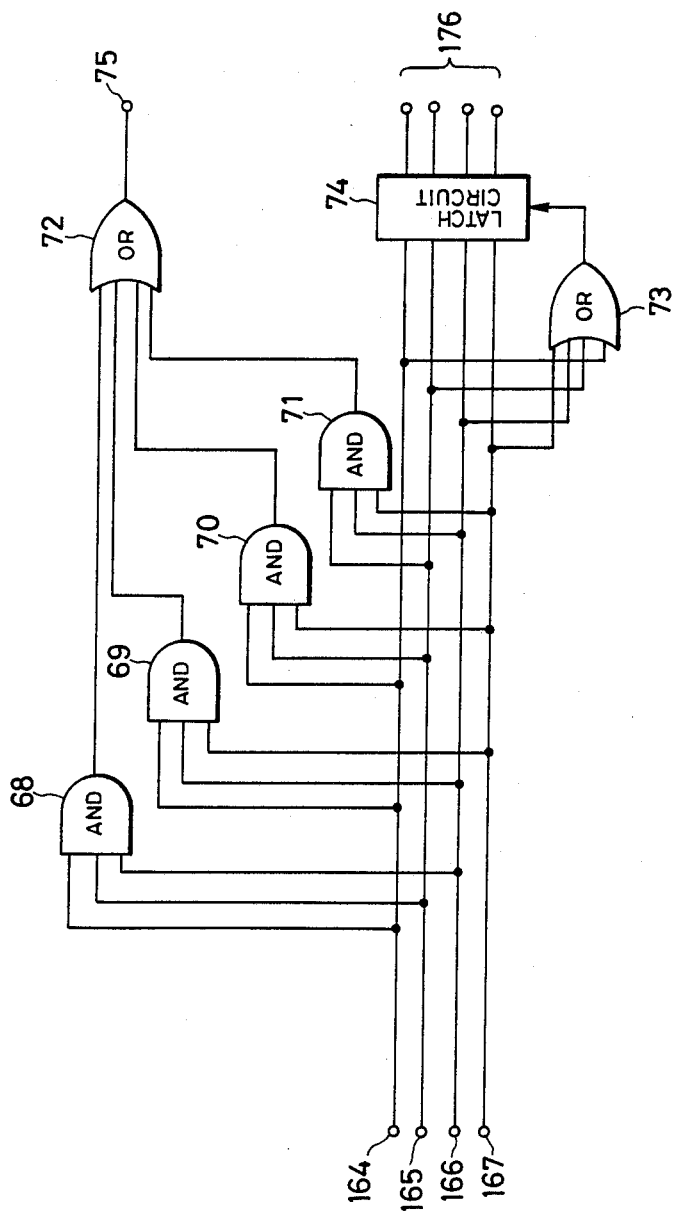
FIG. 31 is an illustration of an embodiment in which the hardware is so designed that the computation is commenced when an operation has proceeded to a step in which a third delay time is determined.

FIG. 31 shows an example of the circuit which is arranged to commence, by means of a hardware, the computing operation when the delay times have been received from three sensors. Numerals 164 to 167 denote detection signals delivered by the received signal detection circuit 9 and representing that elastic waves have been detected by the sensors 6a to 6d. These signals are latched in the received signal detection circuit 9 until the next detection cycle is commenced. When earlier three signals amongst these signals have been obtained, the data set terminal 75 is turned ON by the AND circuit 68 to 71 and the OR circuit 72 so that these three signals are output to the port. When one or more signals amongst the four signals have been delivered simultaneously as the first signal, these signals are latched by a latch circuit 74 in accordance with the output of the OR circuit 73, and is output to the port as an order data 176. The operation control unit 1 watches the port and detects the setting and the order of the data from the data derived from the data set terminal 75 and the data derived from the latch circuit 74. When two or more data are generated simultaneously, the order is given by software as in Step S10 in the flow chart explained before. It is possible to attain a higher processing speed by using this hardware employing the described circuit arrangement.

Although in this embodiment the computation is conducted by making use of the earlier three delay times from three sensors out of four, this is not exclusive and the advantage of this embodiment is obtainable when the computation is conducted by using two delay times from two sensors out of three or when five or more sensors are used. It is to be understood also that the principle of this embodiment can be applied not only to the described two-dimensional detection but also to the cases where the coordinates detection is conducted uni-dimensionally or multi-dimensionally.

Thus, in this embodiment, the coordinates of the appointed position are determined by making use of data representing the delay times from a plurality of sensors. The coordinates input apparatus of this embodiment has sensors and detection circuits of a number which is at least one greater than the number required for the detection. In operation, the data from the sensors are picked up from the earliest one and the computation of coordinates is commenced as soon as the required number of data are obtained. With this arrangement, it is possible to reduce any error attributable to large distance between the appointed position and the sensors, because the computation is conducted by using data derived from sensors which are comparatively close to the appointed position. For the same reason, the attenuation of signal levels is decreased and error due to inclusion of error can be minimized. Thus, this embodiment offers a coordinates input apparatus which is capable of determining the coordinates at a high degree of accuracy while minimizing the fluctuation in the amount of error attributable to a change in the location of the appointed position.

In the embodiments described hereinabove, the vibration propagation time is determined by detecting the peak or an inflection point of the envelope of the detection signal, through sensing the zero-cross point of the detection signal. The invention, however, does not exclude such a form that the vibration propagation time is determined from the signal formed by the sensor 6, without requiring formation of the envelope. An embodiment which enables determination of the vibration propagation time without requiring formation of envelope will be described hereinunder.

As explained before, an error of detection of the delay time on the order of about ±½ wavelength may be causes depending on what portion of the detection signal 17 (see FIG. 32) is utilized as the index for the propagation time required for the vibration to propagate from the position of the pen 3 to the position of the sensor 6.

Figure 32:
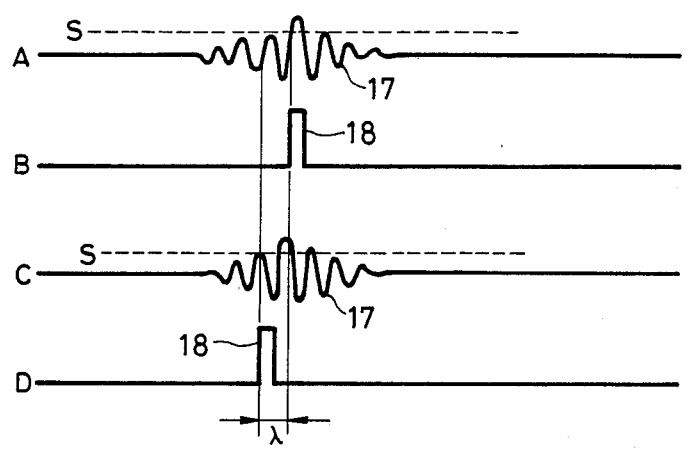
FIG. 32 is an illustration of the state that the delay time varies depending on the position of the detection signal.

For instance, in the case where a predetermined threshold S is set for the signal 17 so as to enable the detection signal to be extracted in the waveform as shown at B in FIG. 32, the positions of the small waves, i.e., the phase, varies according to the distance between the pen 3 and the sensor 6, due to dispersion of the waves. In consequence, the detected propagation delay time may differ by an amount corresponding to almost one full wavelength λ even by a very small displacement of the input pen 3 as shown in FIGS. 32A to 32D. In this embodiment, therefore, the propagation delay time is detected by making use of the velocity of the group of small waves (group velocity) so as to eliminate the above-mentioned error corresponding to one full wavelength, and the position coordinates are computed on the basis of the thus determined delay time.

Figure 33:
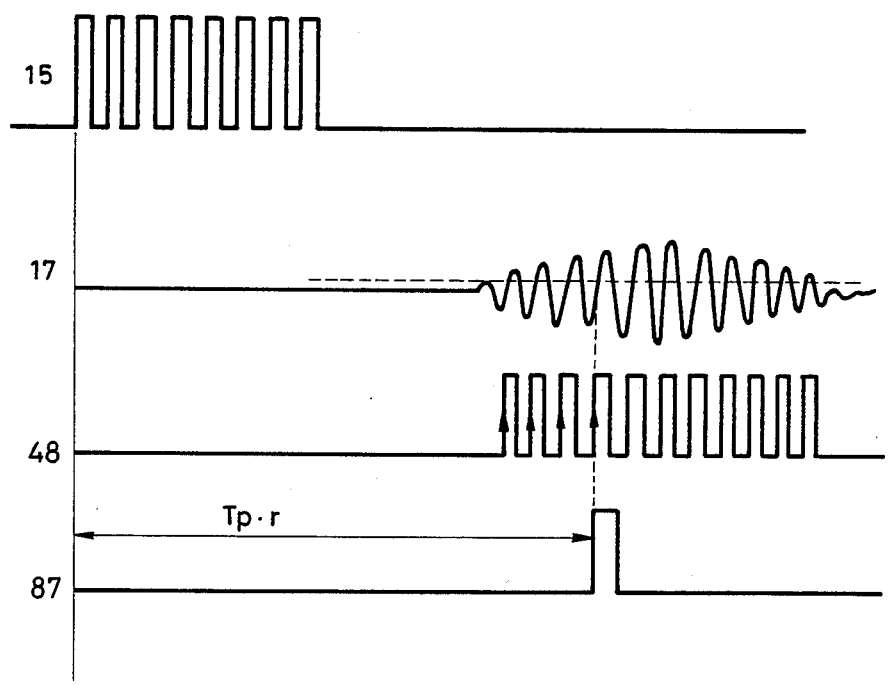
FIG. 33 is an illustration of detection signal as obtained when a regular threshold is used.
Figure 34:
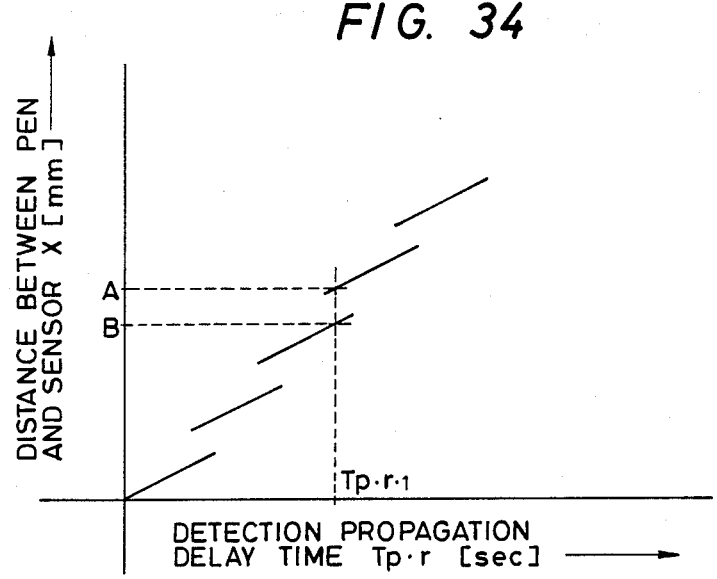
FIG. 34 is an illustration of the relationship between propagation time and propagation distance.

For instance, as shown in FIG. 33, a threshold is set at a level near the zero-cross point and a comparison is conducted so that signals are formed as indicated at 48. The rise of fourth one of these signals 48 is detected and used as a signal 87 representing the propagation delay time Tp.r (phase rise) of the detection signal 17. FIG. 34 shows, by way of example, the relationship between the distance x between the input pen 3 and one of the sensors 6 and the propagation delay time Tp.r. It will be seen that two distance data A and B are obtained for one detection point Tp.r1 in FIG. 34. It is therefore necessary to effect a correction.

In the preceding embodiment explained in connection with FIG. 33, the threshold is set at a level approaching the zero-cross level from the positive side. In this embodiment, a second threshold is set at a level approaching the zero-cross from the negative side and a comparison is effected also with this threshold so that signals indicated at 49 in FIG. 5 are obtained. In this case, the fall of the fourth one of the signals 49 is detected so as to be used as a signal 88 indicative of the propagation delay time Tp.f (phase fall) of the detection signal 17.

Figure 36:
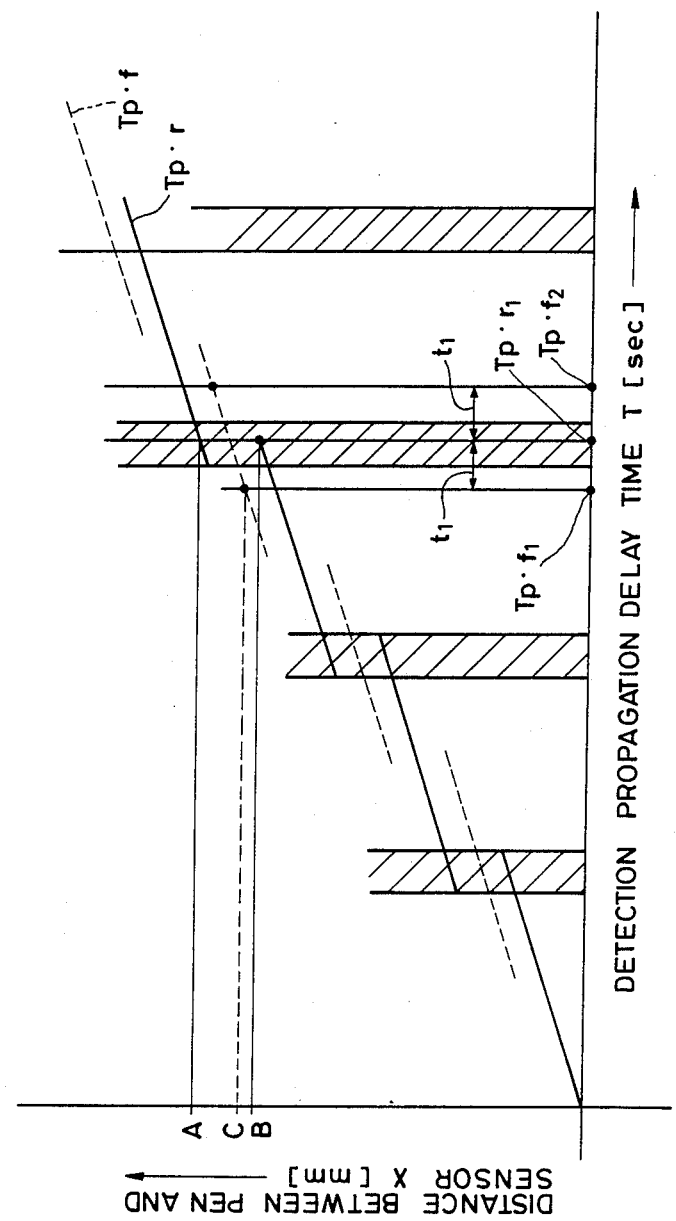
FIG. 36 is an illustration of the relationship between propagation time and propagation distance.

FIG. 36 shows, by way of example, the relationship between the detected propagation delay time Tp.f and the distance X between the pen 3 and one of the sensors 6. Thus, a single delay time signal Tp.f.1 shown in FIG. 34 is obtained for the two distance data A and B obtained for the single delay time signal Tp.r.1, and a single distance data C is obtained for this single delay time data Tp.f.1.

It is thus possible to determine a linear distance-propagation delay time correlation without any step at a high degree of accuracy on the basis of two detection timings, i.e., the timing at which the rise of the fourth signal is detected and the timing at which the fall of the same is detected, from a single detection signal 17. An example of the process for determining such a linear relationship will be explained hereinunder.

For instance, distance data concerning the delay time Tp.r are stored in the form of a table (see FIG. 1) within the operation control unit 1 which has a memory function. In the hatched area of FIG. 36, however two position data are obtained for a single delay time Tp.r so that either one of these two distance data is selectively used by making use of the delay time Tp.f as the reference for judgment.

It will be understood that an offset $t_1$ of time corresponding to ½ wavelength of the detection signal 17 essentially exists between the time delay signals Tp.r and Tp.f. In addition, a time offset amounting to $+t_1$ or $-t_1$ essentially takes place for the time delay signal Tp.r in the hatched area of FIG. 36. Where the conditions as shown in FIG. 36 have been obtained, therefore, the judgment concerning as to which one of the distances A and B is used is conducted upon judging whether the offset of the signal Tp.f.1 with respect to the signal Tp.r.1 is $+t_1$ or $-t_1$. In the illustrated case, this time offset is $-t_1$ so that it is decided that the signal Tp.r.1 corresponds to the distance B and this distance B is detected. The detection of distance which does not fall within the hatched area in FIG. 36 is conducted by extracting and using the distance data corresponding to the signal Tp.r directly from the table within the operation control unit 1.

Assuming here that the distance of the level A indicates the exact position, Tp.f.2 is detected as the Tp.f signal corresponding to Tp.r.1. In this case, since Tp.f.2 is determined by Tp.f.2=Tp.f.1+$t_1$, the distance A is judged to be the exact data which indicates the coordinate position.

Figure 35:
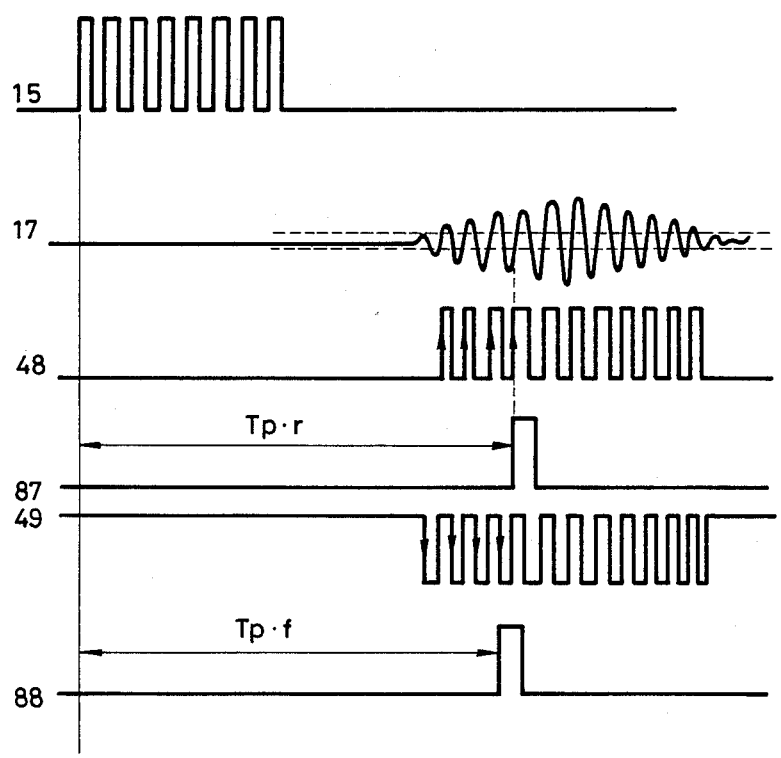
Figure 37:
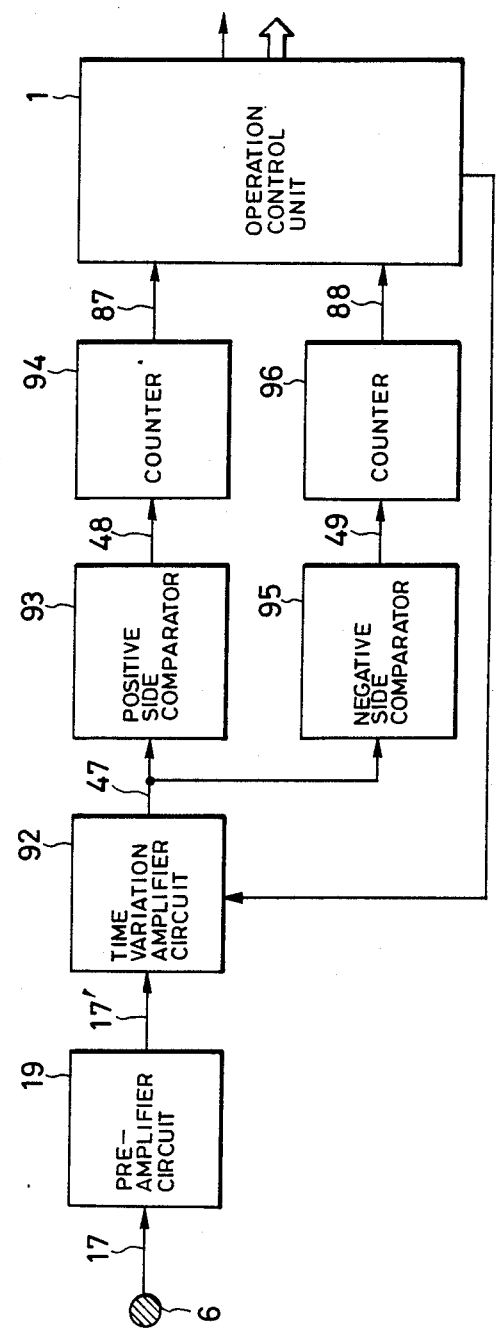
FIG. 37 is a diagram showing the internal structure of the received signal detection unit.

FIG. 37 shows a practical example of the received signal detection circuit suitable for use in the above-described detection of propagation delay time. As will be seen from this Figure, the detection signal 17 from the sensor is amplified to a certain level by a preamplifier 19 and the thus amplified signal 17' is delivered to a time variation amplifier circuit 92 in which any change in the amplitude of the detection signal 17 is compensated for in accordance with the delay time so that a signal 47 having a reduced detection error component is obtained. The signal 47 is then delivered to a positive side comparator 93 and, at the same time, to a negative side comparator 95 which have comparative levels at the positive side and the negative side, respectively. The outputs 48, 49 from these comparators are delivered to counters 94, 96 which are adapted to produce signals upon counting a predetermined number of pulses, e.g., four pulses as in the described case, whereby a Tp.r2 signal 87 and a Tp.f2 signal 88 are obtained as illustrated in FIG. 35.

These signals 87 and 88 are then delivered to the operation control unit 1 so that the distance x is detected at a high degree of accuracy upon consultation with the content of the table (see FIG. 1) which has been set beforehand in the operation control unit.

Thus, in the described embodiment, the position coordinates are detected by sensing the distance x between each sensor and the input pen 3 through detection of the phase velocity which has a dispersing characteristics, and the thus detected position coordinates are displayed on the display 11 or delivered to other external devices.

Figure 38:
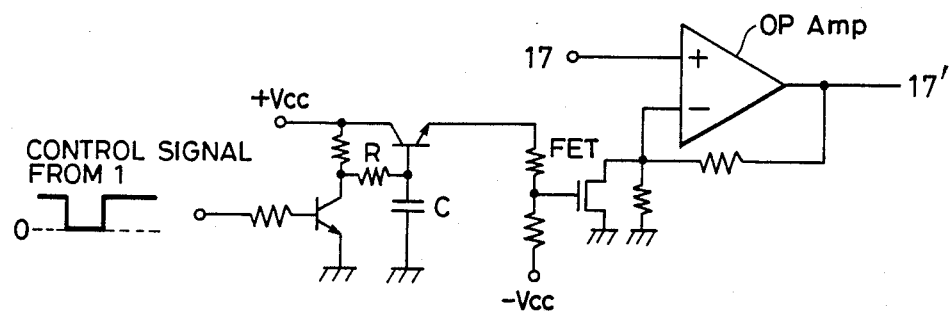
FIG. 38 is an illustration of the construction of a time variation amplifier circuit.
Figure 39:
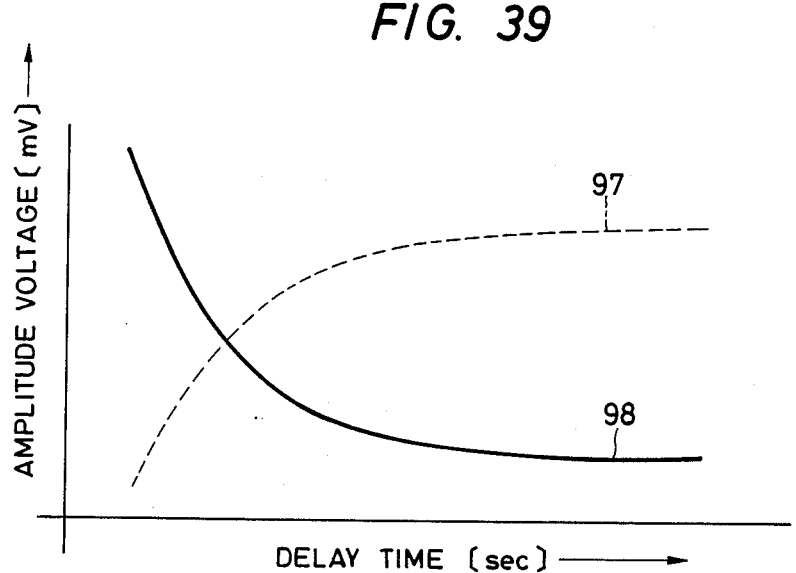
FIG. 39 is a diagram illustrating how the amplitude and the amplification factor are changed in relation to delay time.

FIG. 38 shows, by way of example, the construction of the time variation amplifier circuit 92. In general, the propagation medium 8 exhibits such characteristics that the amplitude voltage is decreased as the delay time is increased, as shown by a solid-line curve 98 in FIG. 39. It is, therefore, effective to compensate for this reduction in amplitude voltage by amplifying the output 97 from the preamplifier 19 by means of an amplifier having an amplification factor as shown by a broken-line curve 97 in FIG. 39. It is to be understood that the characteristics and the change in amplification of the resistance $R_{DS}$ between the drain and the source of a FET (Field Effect Transistor) approximate an exponential curve. Therefore, the compensation for reduction in the amplitude voltage can be conducted by making use of the charging/discharging characteristics of a capacitor C and a resistor R which are arranged as shown in FIG. 38. The time variation start signal is delivered to the operation control unit 1 in synchronism with the drive signal for driving the input pen 3. It will be obvious to those skilled in the art that the operation of the embodiment described in connection with FIG. 37 may be done on the basis of the delay time signal Tp.f, though the described operation is based upon the delay time signal Tp.r.

As will be understood from the foregoing description, in this embodiment, two signals indicative of the propagation delay time are detected by means of thresholds which are set at the positive and negative sides of the detection signal derived from the sensor, and the coordinates of the position appointed by the input pen are computed on the basis of the thus obtained two time delay signals and the phase velocity. It is therefore possible to attain a high degree of accuracy of the coordinates detection.

It is to be understood also that the described embodiment makes use of the plate wave of an elastic wave in such a manner as to minimize any detection error attributable to the difference between the group velocity and the phase velocity, and the position coordinates are computed by making use of the rise and fall of the detection signal wave and the phase velocity, thus enabling a high degree of accuracy of position detection. This contributes to an increase in the resolution (accuracy) of the coordinates input apparatus which is typically a digitizer, and makes it possible to design a transparent digitizer having input and output devices united with each other.

It is to be undetstood also that the described embodiment effectively reduces detection error of the delay time by the provision of the time variation amplifier circuit.

In addition, the described embodiment makes it possible to use only the detection signal pulses having high S/N ratio, thus reducing detection error, by a suitable selection of the number of pulses set in the counter for measuring the propagation delay time.

Furthermore, the counter for measuring the propagation delay time is adapted for selecting pulses which are close to the leading end of the detection signal wave, which pulses having high S/N ratio values and less liable to be affected by reflected wave. This effectively reduces any unfavorable effect caused by waves reflected by the end surface of the vibration propagation medium or from the anti-reflection member and, hence, increases the effective input area of the coordinates input apparatus which is typically a digitizer.

We claim:

1. A coordinates input apparatus comprising:
vibration propagation means for allowing a vibration to propagate therethrough;
an input pen for applying vibration to said vibration propagation means;
vibration detecting means for detecting vibration applied by said input pen;
envelope output means for producing an envelope signal representing the envelope of the vibration detected by said vibration detecting means;
differentiation means for conducting a differentiation of said envelope signal produced by said envelope output means;
control means adapted for determining, a: the time of arrival of said vibration, a zero-cross point of said vibration detected by said vibration detecting means located in the vicinity of a zero-cross point of the signal from said differentiation means; and
computing means for computing the distance between said input pen and said vibration detection means from the time determined by said control means.

2. A coordinates input apparatus according to claim 1, wherein said input pen includes a vibration means having a piezoelectric element.

3. A coordinates input apparatus according to claim 1, wherein said vibration detection means includes a piezoelectric element, and a plurality of such vibration detection means are provided in contact with different portions of said vibration propagation means.

4. A coordinates input apparatus according to claim 1, further comprising a counter adapted for counting an internal clock for measuring the time length between the moment at which said vibration is applied to said vibration propagation means by said input pen to the time of arrival of said vibration determined by said control means.

5. A coordinates input apparatus according to claim 1, further comprising delay time regulation means for regulating the delay time incurred during signal processing in said envelope output means, said differentiation means and said control means.

6. A coordinates input apparatus according to claim 1, wherein said vibration propagation means is made of a transparent tabular member and display means is provided under said vibration propagation means.

7. A coordinates input apparatus according to claim 1, wherein said vibration detection means are provided in contact with a reverse side of a plane which the vibration of said vibration propagation means is applied to.

8. A coordinates input apparatus according to claim 7, wherein said vibration detection means has a function as a supporting member of said vibration propagation means.

9. A coordinates input apparatus comprising:

an input pen having a vibrator which produces vibration in accordance with driving pulses;

vibration propagation means adapted to be contacted by said input pen so as to receive and propagate said vibration;

a plurality of vibration detection means provided in contact with different portions of said vibration propagation means and adapted to convert the vibration into electric signals upon detecting said vibration which have propagated through said vibration propagation means;

envelope generating means for generating a signal representing the envelope of each of said electric signals from said vibration detection means;

differentiation means adapted for conducting a predetermined number of differentiation operations on said envelope signal generated by said envelope generating means;

computing means for determining, as the arriving time of said vibration, the timing of a zero-cross of the signal from said vibration detection means immediately after a zero-cross point of the signal derived from said differentiation means, said computing means further adapted to compute the position where said input pen contacts said vibration propagation means from the time required for said vibration to propagate from the position of contact of said input pen to the position where said detection means are provided; and display means for displaying data concerning the position where said input pen contacts said vibration propagation means computed by said computing means.

10. A coordinates input apparatus according to claim 6, wherein said computing means includes table means for converting the vibration propagation time into vibration propagation distance.

11. A coordinates input apparatus according to claim 9, wherein said vibration propagation means is made of a transparent tabular member and display means is provided under said vibration propagation means.

12. A coordinates input apparatus according to claim 9, wherein said vibration detection means are provided in contact with a reverse side of a plane which the vibration of said vibration propagation means is applied to.

13. A coordinates input apparatus according to claim 12, wherein said vibration detection means has a function as a supporting member of said vibration propagation means.

14. A coordinates input apparatus according to claim 9, further comprising driving means for driving said vibrator in said input pen.

15. A coordinates input apparatus according to claim 14, further comprising modulation means for modulating the driving pulses produced by said driving means.

16. A coordinates input apparatus according to claim 14, wherein the frequency of said driving pulses produced by said driving means is substantially the same as the resonance frequency of said vibrator.

17. A coordinate input apparatus comprising:
vibration generation means for vibrating in response to driving pulses;
vibration propagation means for receiving said vibration from said vibration generating means and for propagating the received vibration;
vibration detecting means for detecting said vibration propagating through said vibration propagation means;
threshold level setting means for setting threshold levels on the positive side and negative side of the zero level of the vibration detected by said vibration detecting means; and
control means for determining the time of arrival of said vibration at said vibration detecting means, from said vibration detected by said vibration detection means exceeded said threshold levels at both said positive and negative sides.

18. A coordinates input apparatus according to claim 17, wherein said threshold levels set by said threshold level setting means are set in the vicinity of said zero level.

19. A coordinates input apparatus according to claim 17, wherein said control means includes a computing means for computing, from said time of arrival, the distance between said vibration generating means and said vibration detecting means.

20. A coordinates input apparatus according to claim 17, wherein said vibration propagation means includes a tabular member.

21. A coordinates input apparatus according to claim 20, wherein display means is provided under said vibration propagation means.

22. A coordinates input apparatus according to claim 17, wherein said vibration detection means are provided in contact with a reverse side of a plane which the vibration of said vibration propagation means is applied to.

23. A coordinates input apparatus according to claim 22, wherein said vibration detection means has a function as a supporting member of said vibration propagation means.

24. A coordinates input apparatus comprising:
vibration generating means for generating vibration in response to a signal
vibration propagation means for receiving vibration from said vibration generating means and for propagating the received vibration;
vibration detecting means provided in contact with said vibration propagation means and adapted for detecting the vibration delivered from said vibration generating means; and
computing means for computing, from the group velocity and the phase velocity of said vibration detected by said vibration detecting means, the distance between said vibration generating means and said vibration detecting means.

25. A coordinates input apparatus according to claim 24, wherein said vibration detected by said vibration detecting means is a plate-wave elastic wave.

26. A coordinates input apparatus according to claim 24, wherein said computing means is adapted for detecting the time of arrival of said vibration from the phase waveform in the vicinity of a singular point of said group velocity and for computing the distance from said time of arrival.

27. A coordinates input apparatus according to claim 24, wherein said vibration generating means and said vibration detecting means include piezoelectric elements.

28. A coordinates input apparatus according to claim 24, wherein said vibration propagation means includes a transparent tabular member.

29. A coordinates input apparatus according to claim 28, further comprising display means covered by said vibration propagation means.

30. A coordinates input apparatus according to claim 24, wherein said vibration detection means are provided in contact with a reverse side of a plane which the vibration of said vibration propagation means is applied to.

31. A coordinates input apparatus according to claim 30, wherein said vibration detection means has a function as a supporting member of said vibration propagation means.

32. A coordinates input apparatus comprising:
vibration generating means adapted to vibrate in response to a signal;
vibration propagation means for receiving said vibration generated by said vibration generating means and for propagating the received vibration;
vibration detecting means for detecting the vibration propagated through said vibration propagation means;
envelope signal generating means for generating an envelope signal representing the envelope of the vibration detected by said vibration detecting means;
arrival signal generating means for generating a signal indicating that said vibration generated by said vibration generating means has propagated through said vibration propagation means and arrived at said vibration detecting means, from said envelope signal and said vibration detected by said vibration detecting means; and
computing means for computing the propagation time of said vibration upon receipt of said arrival signal, in such a manner as to compensate for loss time incurred in said envelope signal generating means.

33. A coordinates input apparatus according to claim 32, wherein said vibration detected by said vibration detecting means is a plate-wave elastic wave.

34. A coordinates input apparatus according to claim 32, wherein said vibration generating means and said vibration detecting means include piezoelectric elements.

35. A coordinates input apparatus according to claim 32, further comprising driving means for generating the driving signal to be delivered to said vibration generating means and modulation means for modulating the generated driving signal.

36. A coordinates input apparatus according to claim 32, wherein a plurality of said vibration detecting means are provided in contact with different portions of said vibration propagation means.

37. A coordinates input apparatus according to claim 32, wherein said vibration propagation means includes a transparent tabular member superposed on said display means.

38. A coordinates input apparatus according to claim 37, wherein display means is provided under said vibration propagation means.

39. A coordinates input apparatus according to claim 32, wherein said vibration detection means are provided in contact with a reverse side of a plane which the vibration of said vibration propagation means is applied to.

40. A coordinates input apparatus according to claim 39, wherein said vibration detection means has a function as a supporting member of said vibration propagation means.

41. A method of determining a vibration propagation time comprising the steps of:
a first step for applying a vibration to a vibration propagation means and simultaneously starting a counter for counting an internal clock to generate a time value;
a second step for generating an envelope signal representing the envelope of a signal from vibration detecting means disposed in contact with said vibration propagation means;
a third step for detecting the peak of said envelope signal; and
a fourth step for determining the propagation time from the value counted by said counter till the moment of zero-cross of the first signal from said vibration detecting means after the detection of said peak of said envelope signal.

42. A coordinates input apparatus comprising:
a tabular vibration propagation means for propagating vibration;
vibration means adapted for generating vibration upon receipt of an electric signal;
an input pen adapted for delivering said vibration generated by said vibration means to said vibration propagation means at a desired portion of said vibration propagation means;
vibration detection means held in contact with said vibration propagation means so as to detect said vibration propagated through said vibration propagation means; and
driving means for producing modulated pulses for driving said vibration means such that the envelope of the detection signal produced by said vibration detection means includes a plurality of peaks.

43. A coordinates input apparatus according to claim 42, further comprising envelope signal generating means adapted for generating the envelope of the vibration detected by said vibration detection means and means for detecting the peak of said envelope signal.

44. A coordinates input apparatus according to claim 42, wherein said vibration detected by said vibration detection means is a plate-wave elastic wave.

45. A coordinates input apparatus according to claim 42, wherein said vibration generating means includes a piezoelectric element.

46. A coordinates input apparatus according to claim 42, wherein said vibration propagation means is made of a transparent tabular member and display means is provided under said vibration propagation means.

47. A coordinates input apparatus comprising:
vibration propagation means for propagating a vibration therethrough;
an input pen for applying a vibration to said vibration propagation means;
vibration detection means for detecting vibration applied to said vibration propagation means by said input pen;
differentiation means for effecting a plurality of differentiation operations an envelope signal delivered by an envelope signal generating means adapted for outputting the envelope of the vibration detected by said vibration detection means;
control means for determining, as a vibration arrival time, the zero-cross point of said vibration detected by said vibration detection means in the vicinity of a zero-cross point of the signal derived from said differentiation means; and computing means for computing the distance between said input pen and said vibration detection means from the arrival time determined by said control means.

48. A coordinates input apparatus according to claim 47, wherein said vibration detected by said vibration detection means is a plate-wave elastic wave.

49. A coordinates input apparatus according to claim 47, wherein said computing means includes a counter adapted for counting an internal clock for measuring the propagation time of said vibration in response to the time of arrival of said vibration.

50. A coordinates input apparatus according to claim 49, wherein said computing means includes a table for converting said propagation time into said distance.

51. A coordinates input apparatus according to claim 47, wherein said vibration propagation means includes a transparent tabular member.

52. A coordinates input apparatus according to claim 51, wherein display means is provided under said vibration propagation means.

53. A coordinates input apparatus according to claim 47, wherein said vibration detection means are provided in contact with a reverse side of a plane which the vibration of said vibration propagation means is applied to.

54. A coordinates input apparatus according to claim 53, wherein said vibration detection means has a function as a supporting member of said vibration propagation means.

55. A coordinates input apparatus comprising:
signal generating means for generating signals for appointing a position whose coordinates are to be input;
signal propagation means for propagating said signal generated by said signal generating means;
a plurality of signal detection means provided at different positions so as to detect said signal propagated through said signal propagation means;
order setting means for setting the order of said signal detection means so as to select a predetermined number of said detecting means out of all said signal detecting means in accordance with the order of receipt of said signal propagated through said signal propagation means; and
computing means for computing the position appointed by said signal generating means on the basis of the timings of the detection of said signal by said signal detecting means selected by said order setting means.

56. A coordinates input apparatus according to claim 55, wherein said signal generating means includes a piezoelectric element adapted to vibrate in response to driving pulses.

57. A coordinates input apparatus according to claim 55, wherein four of said signal detection means are provided and three out of four signal detecting means are selected by said order setting means.

58. A coordinates input apparatus according to claim 55, wherein said signal propagation means includes a transparent tabular member.

59. A coordinates input apparatus according to claim 55, wherein said tabular member is superposed on said display means.

60. A coordinates input apparatus according to claim 55, wherein said plurality of signal detection means are provided in contact with a reverse side of a plane which the signals of said signal propagation means are applied to.

61. A coordinates input apparatus according to claim 60, wherein said plurality of signal detection means have a function as supporting members of said signal propagation means.

62. A coordinates input apparatus comprising:
a transparent tabular vibration propagation means;
a vibration pen adapted to be placed in contact with said vibration propagation means so as to apply a vibration to said vibration propagation means;
a plurality of vibration detection means provided in contact with said vibration propagation means so as to detect the vibration applied to said vibration propagation means by said vibration pen;
an envelope generating means for generating a signal representing the envelope of the vibration detected by said vibration detection means;
computing means for computing the position where said vibration propagation means is contacted by said vibration pen, from the timing at which said vibration arrived at said vibration detection means; and
display means underlying said vibration propagation means so as to display a position corresponding to the position of contact computed by said computing means.

63. A coordinates input apparatus according to claim 62, wherein said vibration pen and said vibration detection means include piezoelectric elements.

64. A coordinates input apparatus according to claim 62, wherein said vibration detected by said vibration detection means is a plate-wave elastic wave.

65. A coordinates input pen comprising:
vibration generating means adapted for vibrating in response to driving pulses;
a horn for transmitting the vibration generated by said vibration generating means to the end of said pen;
fixing means provided on said horn at such a position where the node of vibration applied by said vibration generating means to said horn appears; and
a holder for holding said horn and said signal generating means through said fixing means.

66. A coordinates input pen according to claim 65, wherein said vibration generating means includes a piezoelectric element.

67. A coordinates input pen according to claim 65, further comprising driving pulse generating means adapted for generating pulses of a frequency substantially the same as the resonance frequency of said horn.

68. A coordinates input pen according to claim 65, wherein the end of said horn is substantially spherically shaped.

69. A coordinates input pen according to claim 65, wherein said horn has a diameter which progressively decreases towards the end remote from said vibration generating means.

70. A coordinates input pen according to claim 65, wherein said fixing means is a rib.

71. A coordinates input pen according to claim 65, wherein said vibration means and said horn are bonded together.

72. A coordinates input apparatus comprising:
vibration means adapted to generate a vibration in response to an electric signal;

a horn for transmitting the vibration generated by said vibration means to an end of a pen; and driving means adapted for generating pulses of a frequency equal to the resonance frequency of said horn so as to drive said vibration means at the resonance frequency of said horn.

73. A coordinates input apparatus according to claim 72, wherein said vibration means includes a piezoelectric element.

74. A coordinates input apparatus according to claim 72, wherein the end of said horn is substantially spherically shaped.

75. A coordinates input apparatus according to claim 72, further comprising a vibration propagation means adapted to be contacted by said horn so as to receive vibration from said horn and to propagate the received vibration.

76. A coordinates input apparatus according to claim 75, further comprising vibration detection means adapted to be held in contact with said vibration propagation means and having a resonance frequency substantially the same as the resonance frequency of said horn.

77. A coordinates input apparatus comprising:

an input pen having a vibrator which produces vibration in accordance with driving pulses;

vibration propagation means adapted to be contacted by said input pen so as to receive and propagate said vibration;

a plurality of vibration detection means provided in contact with different portions of said vibration propagation means and adapted to convert the vibration into electric signals upon detecting said vibration which have propagated through said vibration propagation means;

envelope generating means for generating a signal representing the envelope of each of said electric signals from said vibration detection means;

differentiation means adapted for conducting a predetermined number of differentiation operations on said envelope signal generated by said envelope generating means; and computing means for determining, as the arriving time of said vibration, the timing of a zero-cross of the signal from said vibration detection means immediately after a zero-cross of the signal derived from said differentiation means, said computing means further adapted to compute the position where said input pen contacts said vibration propagation means from the time required for said vibration to propagate from the position of contact of said input pen to the position where said detection means are provided.

78. A coordinates input apparatus according to claim 77, further comprising driving means for driving said vibrator in said input pen.

79. A coordinates input apparatus according to claim 77, further comprising modulation means for modulating the driving pulses produced by said driving means.

80. A coordinates input apparatus according to claim 77, wherein the frequency of said driving pulses produced by said driving means is substantially the same as the resonance frequency of said vibrator.

81. A coordinates input apparatus according to claim 77, wherein said computing means includes table means for converting the vibration propagation time into vibration propagation distance.

* * * * *

UNITED STATES PATENT AND TRADEMARK OFFICE
CERTIFICATE OF CORRECTION

PATENT NO. : 4,931,965

DATED : June 5, 1990

INVENTOR(S) : KIYOSHI KANEKO ET AL.

It is certified that error appears in the above-identified patent and that said Letters Patent is hereby corrected as shown below:

COLUMN 2

Line 61, "resoance" should read --resonance--.

COLUMN 7

Line 44, "that" should read --than--.

COLUMN 16

Line 26, "detection signal is received within the period of the" should be deleted.
    Line 27 should be deleted.
    Line 28, "S17 and another process is commenced. The" should be deleted.
    Line 30, "computer" should read --computed--.

COLUMN 27

Line 64, "FIG. 5" should read --FIG. 35--.

COLUMN 29

Line 18, "output 97" should read --output--.

COLUMN 30

Line 25, "a:" should read --as--.

COLUMN 33

Line 35, "loss" should read --loss of--.

UNITED STATES PATENT AND TRADEMARK OFFICE
CERTIFICATE OF CORRECTION

PATENT NO. : 4,931,965
DATED : June 5, 1990
INVENTOR(S) : KIYOSHI KANEKO ET AL.

It is certified that error appears in the above-identified patent and that said Letters Patent is hereby corrected as shown below:

COLUMN 34

Line 62, "an" should read --on an--.

Signed and Sealed this

Ninth Day of November, 1993

Attest:

BRUCE LEHMAN

Attesting Officer

Commissioner of Patents and Trademarks